(12) United States Patent
Zhang et al.

(10) Patent No.: US 10,169,075 B2
(45) Date of Patent: Jan. 1, 2019

(54) METHOD FOR PROCESSING INTERRUPT BY VIRTUALIZATION PLATFORM, AND RELATED DEVICE

(71) Applicant: Huawei Technologies Co., Ltd., Shenzhen (CN)

(72) Inventors: Haoyu Zhang, Shenzhen (CN); Hongyong Zang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 241 days.

(21) Appl. No.: 15/384,961

(22) Filed: Dec. 20, 2016

(65) Prior Publication Data

US 2017/0102963 A1    Apr. 13, 2017

Related U.S. Application Data

(63) Continuation of application No. PCT/CN2014/080430, filed on Jun. 20, 2014.

(51) Int. Cl.
*G06F 9/455* (2018.01)
*G06F 9/48* (2006.01)

(52) U.S. Cl.
CPC ........ *G06F 9/4812* (2013.01); *G06F 9/45533* (2013.01); *G06F 2009/45579* (2013.01)

(58) Field of Classification Search
None
See application file for complete search history.

(56) References Cited

U.S. PATENT DOCUMENTS

| 2009/0100424 A1 | 4/2009 | Otte et al. |
| 2010/0138208 A1 | 6/2010 | Hattori et al. |

(Continued)

FOREIGN PATENT DOCUMENTS

| CN | 102799465 A | 11/2012 |
| CN | 103559087 A | 2/2014 |

(Continued)

OTHER PUBLICATIONS

Foreign Communication From A Counterpart Application, Japanese Application No. 2016-574176, Japanese Office Action dated Dec. 12, 2017, 5 pages.
Foreign Communication From A Counterpart Application, Japanese Application No. 2016-574176, English Translation of Japanese Office Action dated Dec. 12, 2017, 6 pages.
Foreign Communication From A Counterpart Application, PCT Application No. PCT/CN2014/080430, English Translation of International Search Report dated Mar. 23, 2015, 2 pages.

(Continued)

*Primary Examiner* — Wissam Rashid
(74) *Attorney, Agent, or Firm* — Conely Rose, P.C.

(57) ABSTRACT

A method for processing an interrupt by a virtualization platform, and a related device, where the method includes determining an $n^{th}$ physical central processing unit (pCPU) from U target pCPUs when an $i^{th}$ physical interrupt occurs in a $j^{th}$ physical input/output device, setting the $n^{th}$ pCPU to process the $i^{th}$ physical interrupt, determining an $i^{th}$ virtual interrupt according to the $i^{th}$ physical interrupt, and determining an $m^{th}$ virtual central processing unit (vCPU) from V target vCPUs such that a $k^{th}$ virtual machine (VM) uses the $m^{th}$ vCPU to execute the $i^{th}$ virtual interrupt, where U, V, i, j, k, m, and n are positive integers while U and V are greater than or equal to 1.

30 Claims, 6 Drawing Sheets

(56) References Cited

U.S. PATENT DOCUMENTS

| | | |
|---|---|---|
| 2011/0088030 A1 | 4/2011 | Agesen et al. |
| 2012/0331467 A1 | 12/2012 | Neiger et al. |
| 2013/0132949 A1 | 5/2013 | Tsirkin |
| 2013/0275638 A1 | 10/2013 | Serebrin et al. |

FOREIGN PATENT DOCUMENTS

| | | |
|---|---|---|
| CN | 103699428 A | 4/2014 |
| JP | 2010128911 A | 6/2010 |
| JP | 2013519169 | 5/2013 |
| WO | 2010085804 A1 | 7/2010 |

OTHER PUBLICATIONS

Foreign Communication From A Counterpart Application, PCT Application No. PCT/CN2014/080430, English Translation of Written Opinion dated Mar. 23, 2015, 6 pages.

Foreign Communication From A Counterpart Application, Korean Application No. 10-2017-7000348, Korean Notice of Allowance and Brief Translation dated Jan. 9, 2018, 4 pages.

Gordon, A., et al. "ELI: Bare-Metal Performance for I/O Virtualization" XP055226063, ASPLOS XVII, Proceedings of the Seventeenth International Conference on Architectural Support for Programming Languages and Operating Systems, vol. 40, Issue 1, Mar. 3-7, 2012, pp. 411-422.

Foreign Communication From A Counterpart Application, European Application No. 14894974.6, Extended European Search Report dated Jul. 4, 2017, 9 pages.

US 10,169,075 B2

METHOD FOR PROCESSING INTERRUPT BY VIRTUALIZATION PLATFORM, AND RELATED DEVICE

CROSS-REFERENCE TO RELATED APPLICATIONS

This application is a continuation of International Patent Application No. PCT/CN2014/080430, filed on Jun. 20, 2014, which is hereby incorporated by reference in its entirety.

TECHNICAL FIELD

Embodiments of the present disclosure relate to the field of communications technologies, and in particular, to a method for processing an interrupt by a virtualization platform, and a related device.

BACKGROUND

A virtualization technology is a decoupling technology in which a bottom-layer hardware device is separated from an upper-layer operating system and application program. As one of important bottom-layer technologies for supporting a currently popular cloud computing platform, the virtualization technology may greatly improve resource utilization of a physical device. Compared with a conventional physical server, a virtual machine (VM) has better performance in the terms of isolation and encapsulation, and may save information of the whole VM in a virtual disk image (VDI), which may facilitate operations such as a snapshot, a backup, a clone, and distribution for the VM. An overhead is generated by virtualization, thereby causing that with a same configuration, performance of a VM is poorer than performance of a physical machine. How to effectively improve performance of a VM is a problem that needs to be solved in this field.

SUMMARY

Embodiments of the present disclosure provide a method for processing an interrupt by a virtualization platform, and a related device, which can reduce impact of an interrupt overhead on a virtualization platform, thereby effectively improving performance of a VM.

According to a first aspect, an embodiment of the present disclosure provides a method for processing an interrupt by a virtualization platform, where the method is applied to a computing node. The computing node includes a physical hardware layer, a host running at the physical hardware layer, at least one VM running on the host, and virtual hardware that is virtualized on the at least one VM, where the physical hardware layer includes X physical central processing units (pCPUs) and Y physical input/output devices, the virtual hardware includes Z virtual central processing units (vCPUs), the Y physical input/output devices include a $j^{th}$ physical input/output device, the at least one VM includes a $k^{th}$ VM, and the $j^{th}$ physical input/output device directs to the $k^{th}$ VM, and the method is executed by the host, and the method includes determining a $n^{th}$ pCPU from U target pCPUs when an $i^{th}$ physical interrupt occurs in the $j^{th}$ physical input/output device, where the U target pCPUs are pCPUs that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs include the U target pCPUs, and the Z vCPUs include the V target vCPUs, using the $n^{th}$ pCPU to process the $i^{th}$ physical interrupt, determining the $i^{th}$ virtual interrupt according to the $i^{th}$ physical interrupt, and determining a $m^{th}$ vCPU from the V target vCPUs such that the $k^{th}$ VM uses the $m^{th}$ vCPU to execute the $i^{th}$ virtual interrupt, where X, Y, and Z are positive integers greater than 1, U is a positive integer greater than or equal to 1 and less than or equal to X, V is a positive integer greater than or equal to 1 and less than or equal to Z, and i, j, k, m, and n are positive integers.

With reference to the first aspect, in a first possible implementation manner of the first aspect, the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt are determined in the following manners. Determining the affinity relationship between the V target vCPUs and the $i^{th}$ virtual interrupt, where the V target vCPUs are vCPUs that are virtualized on the $k^{th}$ VM and can process the $i^{th}$ virtual interrupt, determining the U target pCPUs, where the V target vCPUs can run on the U target pCPUs, and U is equal to 1, determining the $i^{th}$ physical interrupt corresponding to the $i^{th}$ virtual interrupt, and determining the affinity relationship between the $i^{th}$ physical interrupt and the U target pCPUs, where the $i^{th}$ physical interrupt can be processed by the U target pCPUs.

With reference to the first aspect, in a second possible implementation manner of the first aspect, the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt are determined in the following manners. Determining the affinity relationship between the V target vCPUs and the $i^{th}$ virtual interrupt, where the V target vCPUs are vCPUs that are virtualized on the $k^{th}$ VM and can process the $i^{th}$ virtual interrupt, determining the U target pCPUs, where the V target vCPUs can run on the multiple target pCPUs, and U is a positive integer greater than 1 and less than or equal to X, determining the $i^{th}$ physical interrupt corresponding to the $i^{th}$ virtual interrupt, and determining the affinity relationship between the $i^{th}$ physical interrupt and the U target pCPUs, where the $i^{th}$ physical interrupt can be processed by the U target pCPUs.

With reference to the second possible implementation manner of the first aspect, in a third possible implementation manner of the first aspect, when the affinity relationship between the $i^{th}$ physical interrupt and the U target pCPUs is a one-to-many affinity relationship, determining the $m^{th}$ vCPU from the V target vCPUs includes determining whether there is at least one target vCPU of the V target vCPUs that runs on the $n^{th}$ pCPU, and determining one target vCPU running on the $n^{th}$ pCPU as the $m^{th}$ vCPU when there is at least one target vCPU of the V target vCPUs that runs on the $n^{th}$ pCPU, or determining one target vCPU from the V target vCPUs as the $m^{th}$ vCPU according to a priority sequence when there is not at least one target vCPU of the V target vCPUs that runs on the $n^{th}$ pCPU.

With reference to the third possible implementation manner of the first aspect, in a fourth possible implementation manner of the first aspect, determining whether there is at least one target vCPU of the V target vCPUs that runs on the $n^{th}$ pCPU includes determining, according to virtual interrupt route information, whether there is at least one target vCPU of the V target vCPUs that runs on the $n^{th}$ pCPU, where the virtual interrupt route information includes a correspondence between the U target pCPUs and target vCPUs running on the U target pCPUs.

According to a second aspect, an embodiment of the present disclosure provides a method for processing an interrupt by a virtualization platform, where the method is applied to a computing node. The computing node includes a physical hardware layer, a host running at the physical hardware layer, Y VMs running on the host, Y virtual host (vhost) kernel threads running on the host, and virtual hardware that is virtualized on the at least one VM, where the physical hardware layer includes X pCPUs, the virtual hardware includes Z vCPUs, each VM of the Y VMs includes a paravirtualized driver (virtio device), the Y VMs include the $k^{th}$ VM, the $k^{th}$ VM includes the $i^{th}$ virtio device, and the $i^{th}$ virtio device corresponds to the $j^{th}$ vhost kernel thread of the Y vhost kernel threads, and the method is executed by the host, and the method includes determining the $n^{th}$ pCPU from U target pCPUs when the $j^{th}$ vhost kernel thread triggers the $i^{th}$ vhost thread, where the U target pCPUs are pCPUs that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs include the U target pCPUs, and the Z vCPUs include the V target vCPUs, using the $n^{th}$ pCPU to process the $i^{th}$ vhost thread, determining the virtual interrupt of the $i^{th}$ virtio device according to the $i^{th}$ vhost thread, and determining the $m^{th}$ vCPU from the V target vCPUs such that the $k^{th}$ VM uses the $m^{th}$ vCPU to execute the virtual interrupt of the $i^{th}$ virtio device, where X, Y, and Z are positive integers greater than 1, U is a positive integer greater than or equal to 1 and less than or equal to X, V is a positive integer greater than or equal to 1 and less than or equal to Z, and i, j, k, m, and n are positive integers.

With reference to the second aspect, in a first possible implementation manner of the second aspect, the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are determined in the following manners. Determining the affinity relationship between the V target vCPUs and the $i^{th}$ virtual interrupt, where the V target vCPUs are vCPUs that are virtualized on the $k^{th}$ VM and can process the virtual interrupt of the $i^{th}$ virtio device, determining the U target pCPUs, where the V target vCPUs can run on the U target pCPUs, and U is equal to 1, determining the $i^{th}$ vhost thread corresponding to the virtual interrupt of the $i^{th}$ virtio device, and determining the affinity relationship between the $i^{th}$ vhost thread and the U target pCPUs, where the $i^{th}$ vhost thread can be processed by the U target pCPUs.

With reference to the second aspect, in a second possible implementation manner of the second aspect, the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are determined in the following manners. Determining the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determining the U target pCPUs, where the V target vCPUs can run on the multiple target pCPUs, and U is a positive integer greater than 1 and less than or equal to X, determining the $i^{th}$ vhost thread corresponding to the virtual interrupt of the $i^{th}$ virtio device, and determining the affinity relationship between the $i^{th}$ vhost thread and the U target pCPUs, where the $i^{th}$ vhost thread can be processed by the U target pCPUs.

With reference to the second possible implementation manner of the second aspect, in a third possible implementation manner of the second aspect, when the affinity relationship between the $i^{th}$ vhost thread and the U target pCPUs is a one-to-many affinity relationship, determining the $m^{th}$ vCPU from the V target vCPUs includes determining whether there is at least one target vCPU of the V target vCPUs that runs on the $n^{th}$ pCPU, and determining one target vCPU running on the $n^{th}$ pCPU as the $m^{th}$ vCPU when there is at least one target vCPU of the V target vCPUs that runs on the $n^{th}$ pCPU, or determining one target vCPU from the V target vCPUs as the $m^{th}$ vCPU according to a priority sequence when there is not at least one target vCPU of the V target vCPUs that runs on the $n^{th}$ pCPU.

With reference to the third possible implementation manner of the second aspect, in a fourth possible implementation manner of the second aspect, determining whether there is at least one target vCPU of the V target vCPUs that runs on the $n^{th}$ pCPU includes determining, according to virtual interrupt route information of a virtio device, whether there is at least one target vCPU of the V target vCPUs that runs on the $n^{th}$ pCPU, where the virtual interrupt route information of the virtio device includes a correspondence between the U target pCPUs and target vCPUs running on the U target pCPUs.

According to a third aspect, an embodiment of the present disclosure provides a host, where the host is applied to a computing node. The computing node includes a physical hardware layer, the host running at the physical hardware layer, at least one VM running on the host, and virtual hardware that is virtualized on the at least one VM, where the physical hardware layer includes X pCPUs and Y physical input/output devices, the virtual hardware includes Z vCPUs, the Y physical input/output devices include the $j^{th}$ physical input/output device, the at least one VM includes the $k^{th}$ VM, and the $j^{th}$ physical input/output device directs to the $k^{th}$ VM, and the host includes a first determining unit configured to determine the $n^{th}$ pCPU from U target pCPUs when the $i^{th}$ physical interrupt occurs in the $j^{th}$ physical input/output device, where the U target pCPUs are pCPUs that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs include the U target pCPUs, and the Z vCPUs include the V target vCPUs, a second invoking unit configured to use the $n^{th}$ pCPU to process the $i^{th}$ physical interrupt, a third determining unit configured to determine the $i^{th}$ virtual interrupt according to the $i^{th}$ physical interrupt, and a fourth determining unit configured to determine the $m^{th}$ vCPU from the V target vCPUs such that the $k^{th}$ VM uses the $m^{th}$ vCPU to execute the $i^{th}$ virtual interrupt, where X, Y, and Z are positive integers greater than 1, U is a positive integer greater than or equal to 1 and less than or equal to X, V is a positive integer greater than or equal to 1 and less than or equal to Z, and i, j, k, m, and n are positive integers.

With reference to the third aspect, in a first possible implementation manner of the third aspect, the first determining unit is further configured to determine the affinity relationship between the V target vCPUs and the $i^{th}$ virtual interrupt, where the V target vCPUs are vCPUs that are virtualized on the $k^{th}$ VM and can process the $i^{th}$ virtual interrupt, determine the U target pCPUs, where the V target vCPUs can run on the U target pCPUs, and U is equal to 1, determine the $i^{th}$ physical interrupt corresponding to the $i^{th}$ virtual interrupt, and determine the affinity relationship between the $i^{th}$ physical interrupt and the U target pCPUs, where the $i^{th}$ physical interrupt can be processed by the U target pCPUs.

With reference to the third aspect, in a second possible implementation manner of the third aspect, the first determining unit is further configured to determine the affinity relationship between the V target vCPUs and the $i^{th}$ virtual interrupt, where the V target vCPUs are vCPUs that are virtualized on the $k^{th}$ VM and can process the $i^{th}$ virtual interrupt, determine the U target pCPUs, where the V target vCPUs can run on the multiple target pCPUs, and U is a positive integer greater than 1 and less than or equal to X, determine the $i^{th}$ physical interrupt corresponding to the $i^{th}$ virtual interrupt, and determine the affinity relationship between the $i^{th}$ physical interrupt and the U target pCPUs, where the $i^{th}$ physical interrupt can be processed by the U target pCPUs.

With reference to the second possible implementation manner of the third aspect, in a third possible implementation manner of the third aspect, the fourth determining unit is further configured to determine whether there is at least one target vCPU of the V target vCPUs that runs on the $n^{th}$ pCPU, and determine one target vCPU running on the $n^{th}$ pCPU as the $m^{th}$ vCPU such that the $k^{th}$ VM uses the $m^{th}$ vCPU to execute the $i^{th}$ virtual interrupt when there is at least one target vCPU of the V target vCPUs that runs on the $n^{th}$ pCPU, or determine one target vCPU from the V target vCPUs as the $m^{th}$ vCPU according to a priority sequence such that the $k^{th}$ VM uses the $m^{th}$ vCPU to execute the $i^{th}$ virtual interrupt when there is not at least one target vCPU of the V target vCPUs that runs on the $n^{th}$ pCPU.

With reference to the third possible implementation manner of the third aspect, in a fourth possible implementation manner of the third aspect, in an aspect of determining whether there is at least one target vCPU of the V target vCPUs that runs on the $n^{th}$ pCPU, the fourth determining unit is further configured to determine, according to virtual interrupt route information, whether there is at least one target vCPU of the V target vCPUs that runs on the $n^{th}$ pCPU, where the virtual interrupt route information includes a correspondence between the U target pCPUs and target vCPUs running on the U target pCPUs.

According to a fourth aspect, an embodiment of the present disclosure provides a host, where the host is applied to a computing node. The computing node includes a physical hardware layer, the host running at the physical hardware layer, Y VMs running on the host, Y vhost kernel threads running on the host, and virtual hardware that is virtualized on the at least one VM, where the physical hardware layer includes X pCPUs, the virtual hardware includes Z vCPUs, X, Y, and Z are positive integers greater than 1, each VM of the Y VMs includes a virtio device, the Y VMs include the $k^{th}$ VM, the $k^{th}$ VM includes the $i^{th}$ virtio device, and the $i^{th}$ virtio device corresponds to the $j^{th}$ vhost kernel thread of the Y vhost kernel threads, and the host includes a first determining unit configured to determine the $n^{th}$ pCPU from U target pCPUs when the $j^{th}$ vhost kernel thread triggers the $i^{th}$ vhost thread, where the U target pCPUs are pCPUs that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs include the U target pCPUs, and the Z vCPUs include the V target vCPUs, a second invoking unit configured to use the $n^{th}$ pCPU to process the $i^{th}$ vhost thread, a third determining unit configured to determine the virtual interrupt of the $i^{th}$ virtio device according to the $i^{th}$ vhost thread, and a fourth determining unit configured to determine the $m^{th}$ vCPU from the V target vCPUs such that the $k^{th}$ VM uses the $m^{th}$ vCPU to execute the virtual interrupt of the $i^{th}$ virtio device, where X, Y, and Z are positive integers greater than 1, U is a positive integer greater than or equal to 1 and less than or equal to X, V is a positive integer greater than or equal to 1 and less than or equal to Z, and i, j, k, m, and n are positive integers.

With reference to the fourth aspect, in a first possible implementation manner of the fourth aspect, the first determining unit is further configured to determine the affinity relationship between the V target vCPUs and the $i^{th}$ virtual interrupt, where the V target vCPUs are vCPUs that are virtualized on the $k^{th}$ VM and can process the virtual interrupt of the $i^{th}$ virtio device, determine the U target pCPUs, where the V target vCPUs can run on the U target pCPUs, and U is equal to 1, determine the $i^{th}$ vhost thread corresponding to the virtual interrupt of the $i^{th}$ virtio device, and determine the affinity relationship between the $i^{th}$ vhost thread and the U target pCPUs, where the $i^{th}$ vhost thread can be processed by the U target pCPUs.

With reference to the fourth aspect, in a second possible implementation manner of the fourth aspect, the first determining unit is further configured to determine the affinity relationship between the V target vCPUs and the $i^{th}$ virtual interrupt, where the V target vCPUs are vCPUs that are virtualized on the $k^{th}$ VM and can process the virtual interrupt of the $i^{th}$ virtio device, determine the U target pCPUs, where the V target vCPUs can run on the multiple target pCPUs, and U is a positive integer greater than 1 and less than or equal to X, determine the $i^{th}$ vhost thread corresponding to the virtual interrupt of the $i^{th}$ virtio device, and determine the affinity relationship between the $i^{th}$ vhost thread and the U target pCPUs, where the $i^{th}$ vhost thread can be processed by the U target pCPUs.

With reference to the second possible implementation manner of the fourth aspect, in a third possible implementation manner of the fourth aspect, the fourth determining unit is further configured to determine whether there is at least one target vCPU of the V target vCPUs that runs on the $n^{th}$ pCPU, and determine one target vCPU running on the $n^{th}$ pCPU as the $m^{th}$ vCPU such that the $k^{th}$ VM uses the $m^{th}$ vCPU to execute the virtual interrupt of the $i^{th}$ virtio device when there is at least one target vCPU of the V target vCPUs that runs on the $n^{th}$ pCPU, or determine one target vCPU from the V target vCPUs as the $m^{th}$ vCPU according to a priority sequence such that the $k^{th}$ VM uses the $m^{th}$ vCPU to execute the virtual interrupt of the $i^{th}$ virtio device when there is not at least one target vCPU of the V target vCPUs that runs on the $n^{th}$ pCPU.

With reference to the third possible implementation manner of the fourth aspect, in a fourth possible implementation manner of the fourth aspect, in an aspect of determining whether there is at least one target vCPU of the V target vCPUs that runs on the $n^{th}$ pCPU, the fourth determining unit is further configured to determine, according to virtual interrupt route information of a virtio device, whether there is at least one target vCPU of the V target vCPUs that runs on the $n^{th}$ pCPU, where the virtual interrupt route information of the virtio device includes a correspondence between the U target pCPUs and target vCPUs running on the U target pCPUs.

According to a fifth aspect, an embodiment of the present disclosure provides a computing node, and the computing node includes Y physical input/output devices, where the Y physical input/output devices include the $j^{th}$ physical input/output device, X pCPUs, a memory that is connected to each of the X pCPUs and each of the Y physical input/output devices, where one or more pCPUs of the X pCPUs are configured to invoke or execute an operation instruction stored in the memory, a host, at least one VM, and virtual hardware that is virtualized on the at least one VM, where the virtual hardware includes Z vCPUs, the at least one VM includes the $k^{th}$ VM, and the $j^{th}$ physical input/output device directs to the $k^{th}$ VM, and the host is configured to determine the $n^{th}$ pCPU from U target pCPUs when the $i^{th}$ physical interrupt occurs in the $j^{th}$ physical input/output device, where the U target pCPUs are pCPUs that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs include the U target pCPUs, and the Z vCPUs include the V target vCPUs, where U is a positive integer greater than or equal to 1 and less than or equal to X, and V is a positive integer greater than or equal to 1 and less than or equal to Z, use the $n^{th}$ pCPU to process the $i^{th}$ physical interrupt, determine the $i^{th}$ virtual interrupt according to the $i^{th}$ physical interrupt, and determine the $m^{th}$ vCPU from the V target vCPUs such that the $k^{th}$ VM uses the $m^{th}$ vCPU to execute the $i^{th}$ virtual interrupt, where i, j, k, m, and n are positive integers.

With reference to the fifth aspect, in a first possible implementation manner of the fifth aspect, the host is further configured to determine the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt in the following manners. Determining the affinity relationship between the V target vCPUs and the $i^{th}$ virtual interrupt, where the V target vCPUs are vCPUs that are virtualized on the $k^{th}$ VM and can process the $i^{th}$ virtual interrupt, determining the U target pCPUs, where the V target vCPUs can run on the U target pCPUs, and U is equal to 1, determining the $i^{th}$ physical interrupt corresponding to the $i^{th}$ virtual interrupt, and determining the affinity relationship between the $i^{th}$ physical interrupt and the U target pCPUs, where the $i^{th}$ physical interrupt can be processed by the U target pCPUs.

With reference to the fifth aspect, in a second possible implementation manner of the fifth aspect, the host is further configured to determine the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt in the following manners. Determining the affinity relationship between the V target vCPUs and the $i^{th}$ virtual interrupt, where the V target vCPUs are vCPUs that are virtualized on the $k^{th}$ VM and can process the $i^{th}$ virtual interrupt, determining the U target pCPUs, where the V target vCPUs can run on the multiple target pCPUs, and U is a positive integer greater than 1 and less than or equal to X, determining the $i^{th}$ physical interrupt corresponding to the $i^{th}$ virtual interrupt, and determining the affinity relationship between the $i^{th}$ physical interrupt and the U target pCPUs, where the $i^{th}$ physical interrupt can be processed by the U target pCPUs.

With reference to the second possible implementation manner of the fifth aspect, in a third possible implementation manner of the fifth aspect, in an aspect of determining the $m^{th}$ vCPU from the V target vCPUs, the host is further configured to determine whether there is at least one target vCPU of the V target vCPUs that runs on the $n^{th}$ pCPU, and determine one target vCPU running on the $n^{th}$ pCPU as the $m^{th}$ vCPU when there is at least one target vCPU of the V target vCPUs that runs on the $n^{th}$ pCPU, or determine one target vCPU from the V target vCPUs as the $m^{th}$ vCPU according to a priority sequence when there is not at least one target vCPU of the V target vCPUs that runs on the $n^{th}$ pCPU.

With reference to the third possible implementation manner of the fifth aspect, in a fourth possible implementation manner of the fifth aspect, in an aspect of determining whether there is at least one target vCPU of the V target vCPUs that runs on the $n^{th}$ pCPU, the host is further configured to determine, according to virtual interrupt route information, whether there is at least one target vCPU of the V target vCPUs that runs on the $n^{th}$ pCPU, where the virtual interrupt route information includes a correspondence between the U target pCPUs and target vCPUs running on the U target pCPUs.

According to a sixth aspect, an embodiment of the present disclosure provides a computing node, and the computing node includes X pCPUs, a memory that is connected to the X pCPUs, where one or more pCPUs of the X pCPUs are configured to invoke or execute an operation instruction stored in the memory, a host, Y VMs, Y vhost kernel threads, and virtual hardware that is virtualized on the at least one VM, where the virtual hardware includes Z vCPUs, each VM of the Y VMs includes a virtio device, the Y VMs include the $k^{th}$ VM, the $k^{th}$ VM includes the $i^{th}$ virtio device, and the $i^{th}$ virtio device corresponds to the $j^{th}$ vhost kernel thread of the Y vhost kernel threads, and the host is configured to determine the $n^{th}$ pCPU from U target pCPUs when the $j^{th}$ vhost kernel thread triggers the $i^{th}$ vhost thread, where the U target pCPUs are pCPUs that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs include the U target pCPUs, and the Z vCPUs include the V target vCPUs, where U is a positive integer greater than or equal to 1 and less than or equal to X, and V is a positive integer greater than or equal to 1 and less than or equal to Z, use the $n^{th}$ pCPU to process the $i^{th}$ vhost thread, determine the virtual interrupt of the $i^{th}$ virtio device according to the $i^{th}$ vhost thread, and determine the $m^{th}$ vCPU from the V target vCPUs such that the $k^{th}$ VM uses the $m^{th}$ vCPU to execute the virtual interrupt of the $i^{th}$ virtio device, where X, Y, and Z are positive integers greater than 1, U is a positive integer greater than or equal to 1 and less than or equal to X, V is a positive integer greater than or equal to 1 and less than or equal to Z, and i, j, k, m, and n are positive integers.

With reference to the sixth aspect, in a first possible implementation manner of the sixth aspect, the host is further configured to determine the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device in the following manners. Determining the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determining the U target pCPUs, where the V target vCPUs can run on the U target pCPUs, and U is equal to 1, determining the $i^{th}$ vhost thread corresponding to the virtual interrupt of the $i^{th}$ virtio device, and determining the affinity relationship between the $i^{th}$ vhost thread and the U target pCPUs, where the $i^{th}$ vhost thread can be processed by the U target pCPUs.

With reference to the sixth aspect, in a second possible implementation manner of the sixth aspect, the host is further configured to determine the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device in the following manners. Determining the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determining the U target pCPUs, where the V target vCPUs can run on the multiple target pCPUs, and U is a positive integer greater than 1 and less than or equal to X, determining the $i^{th}$ vhost thread corresponding to the virtual interrupt of the $i^{th}$ virtio device, and determining the affinity relationship between the $i^{th}$ vhost thread and the U target pCPUs, where the $i^{th}$ vhost thread can be processed by the U target pCPUs.

With reference to the second possible implementation manner of the sixth aspect, in a third possible implementation manner of the sixth aspect, in an aspect of determining the $m^{th}$ vCPU from the V target vCPUs, the host is further configured to determine whether there is at least one target vCPU of the V target vCPUs that runs on the $n^{th}$ pCPU, and determine one target vCPU running on the $n^{th}$ pCPU as the $m^{th}$ vCPU when there is at least one target vCPU of the V target vCPUs that runs on the $n^{th}$ pCPU, or determine one target vCPU from the V target vCPUs as the $m^{th}$ vCPU according to a priority sequence when there is not at least one target vCPU of the V target vCPUs that runs on the $n^{th}$ pCPU.

With reference to the third possible implementation manner of the sixth aspect, in a fourth possible implementation manner of the sixth aspect, in an aspect of determining whether there is at least one target vCPU of the V target vCPUs that runs on the $n^{th}$ pCPU, the host is further configured to determine, according to virtual interrupt route information of a virtio device, whether there is at least one target vCPU of the V target vCPUs that runs on the $n^{th}$ pCPU, where the virtual interrupt route information of the virtio device includes a correspondence between the U target pCPUs and target vCPUs running on the U target pCPUs.

In one aspect of the embodiments of the present disclosure, when the $i^{th}$ physical interrupt occurs in the $j^{th}$ physical input/output device, the $n^{th}$ pCPU is determined from U target pCPUs, where the U target pCPUs are pCPUs that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs include the U target pCPUs, and the Z vCPUs include the V target vCPUs, the $n^{th}$ pCPU is used to process the $i^{th}$ physical interrupt, the $i^{th}$ virtual interrupt is determined according to the $i^{th}$ physical interrupt, and the $m^{th}$ vCPU is determined from the V target vCPUs such that the $k^{th}$ VM uses the $m^{th}$ vCPU to execute the $i^{th}$ virtual interrupt. It can be seen that according to the foregoing technical solution, VM exit (VM-Exit) due to an extra inter-processor interrupt (IPI) that is caused because a pCPU with which a vCPU has an affinity is not a pCPU that is used to process a physical interrupt corresponding to a virtual interrupt that is processed by the vCPU can be effectively avoided, thereby effectively reducing the number of times of context switches, and reducing interference caused by a VM to a pCPU.

In another aspect of the embodiments of the present disclosure, when the $j^{th}$ vhost kernel thread triggers the $i^{th}$ vhost thread, the $n^{th}$ pCPU is determined from U target pCPUs, where the U target pCPUs are pCPUs that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs include the U target pCPUs, and the Z vCPUs include the V target vCPUs, the $n^{th}$ pCPU is used to process the $i^{th}$ vhost thread, the virtual interrupt of the $i^{th}$ virtio device is determined according to the $i^{th}$ vhost thread, and the $m^{th}$ vCPU is determined from the V target vCPUs such that the $k^{th}$ VM uses the $m^{th}$ vCPU to execute the virtual interrupt of the $i^{th}$ virtio device. It can be seen that according to the foregoing technical solution, VM-Exit due to an extra IPI that is caused because a pCPU with which a vCPU has an affinity is not a pCPU that is used to process a physical interrupt corresponding to a virtual interrupt that is processed by the vCPU can be effectively avoided, thereby effectively reducing the number of times of context switches, and reducing interference caused by a VM to a pCPU.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
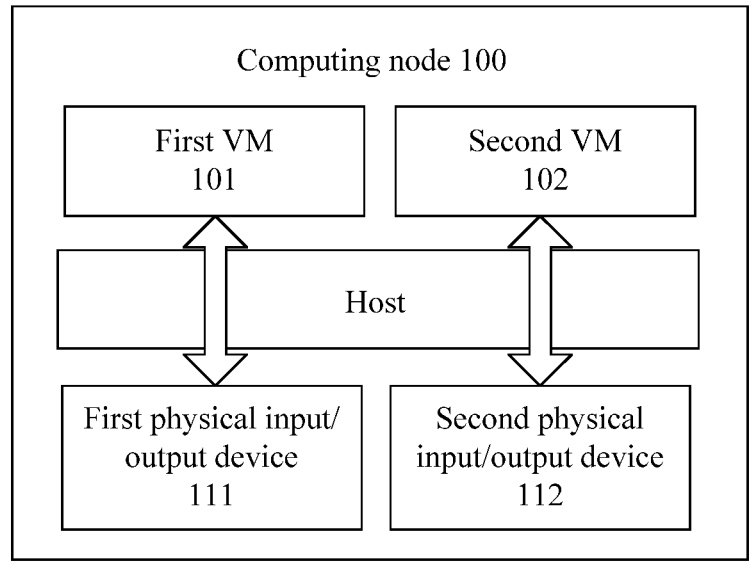
FIG. 1 is a schematic diagram of a direct mode.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

For ease of understanding the embodiments of the present disclosure, several elements that may be introduced for describing the embodiments of the present disclosure are described herein first.

VM: One or more computing nodes may be simulated on one physical computing node using VM software, where the physical computing node may be a server, a desktop computer, a portable computer, or the like. A simulated computing node is referred to as a VM. The physical computing node is referred to as a host. The VM may operate like a real computing node. An operating system and an application program may be installed on the VM. The VM may also access a network resource. Operating systems running on the VM are collectively referred to as a virtual operating system. A program runs in the virtual operating system like running in an operating system of a real computing node. Virtual hardware may further be virtualized on the VM. Further, the virtualization is implemented by virtualizing virtual hardware, such as a vCPU, on the VM by the host. The vCPU is used to process a program running in the VM. One or more vCPUs may correspond to one central processing unit (CPU) in a physical computing node. A CPU in the physical computing node may be referred to as a pCPU. A pCPU may have a guest state and a host state. The pCPU is in the guest state when the VM is running. Due to a special instruction or an external interrupt, the pCPU may switch from the guest state to the host state. This process may be referred to as VM-Exit.

An implementation manner of a virtual device may include a direct mode and a front-back end mode.

Direct mode: The direct mode, which may also be referred to as a passthrough mode, means that a host provides device isolation for a particular VM such that a particular physical input/output device can be exclusively used by the particular VM. In the direct mode, if a pCPU corresponding to a vCPU that processes a virtual interrupt is not consistent with a pCPU that processes a physical interrupt corresponding to the virtual interrupt, VM-Exit due to an extra IPI is caused.

Front-back end mode: The front-back end (split driver) mode means that a virtual device driver is implemented by cooperation of a front-end driver and a back-end driver, where the front-end driver is in a VM and the back-end driver is in a host. The front-end driver and the back-end driver perform data transmission in a memory sharing manner. Compared with a device that is simulated using only software, the front-back end driving mode has a higher level of abstraction and better performance. In the front-back end mode, each VM has a device that uses a virtio device. Each virtio device has a corresponding vhost kernel thread, and the vhost kernel thread runs in a host. A vhost kernel thread is used to process a packet of a corresponding virtio device. In the front-back end mode, if a pCPU corresponding to a vCPU that is used to process a virtual interrupt of a virtio device is not consistent with a pCPU that is used to process a vhost thread corresponding to the virtual interrupt of the virtio device, VM-Exit due to an extra IPI is caused.

FIG. 1 is a schematic diagram of a direct mode. As shown in FIG. 1, in a computing node 100, a first VM 101 may exclusively occupy a first physical input/output device 111, and a second VM 102 may exclusively occupy a second physical input/output device 112. The computing node 100 further includes a host. A method shown in FIG. 3 may be applied to a VM that uses the direct mode shown in FIG. 1.

Figure 2:
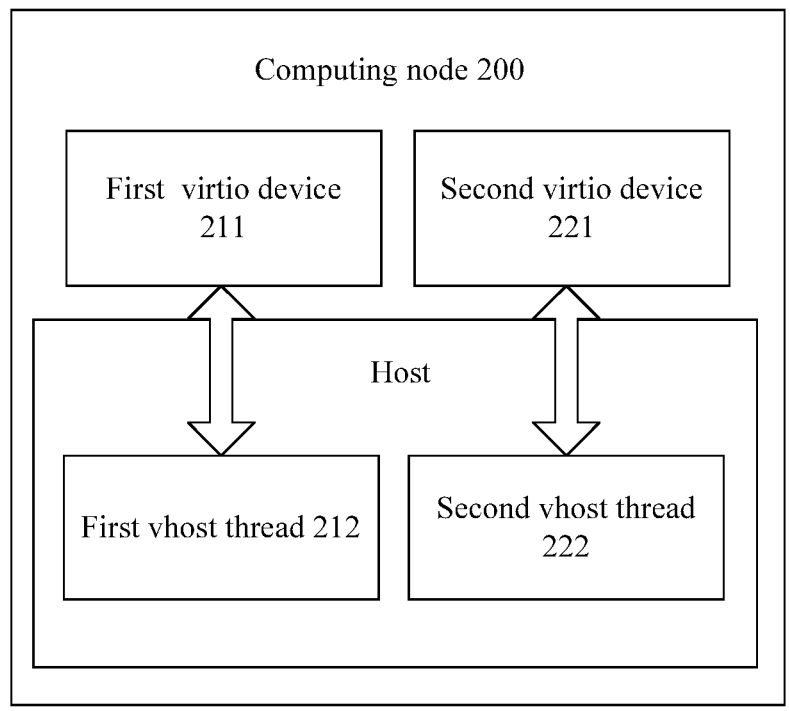
FIG. 2 is a schematic diagram of a front-back end mode.

FIG. 2 is a schematic diagram of a front-back end mode. As shown in FIG. 2, a first virtio device 211 in a computing node 200 corresponds to a first vhost thread 212, and a second virtio device 221 in the computing node 200 corresponds to a second vhost thread 222, where the first virtio device is a virtio device in a first VM, and the second virtio device is a virtio device in a second VM. The computing node 200 further includes a host. A method shown in FIG. 6 may be applied to a VM that uses the front-back end mode shown in FIG. 2.

Figure 3:
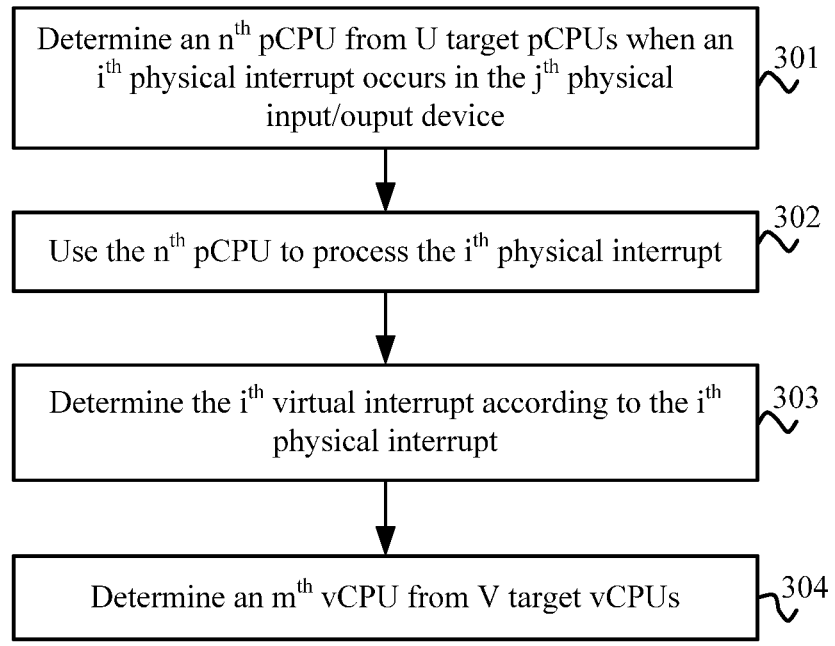
FIG. 3 is a schematic flowchart of a method for processing an interrupt by a virtualization platform according to an embodiment of the present disclosure.

FIG. 3 is a schematic flowchart of a method for processing an interrupt by a virtualization platform according to an embodiment of the present disclosure. The method is applied to a computing node. The computing node includes a physical hardware layer, a host running at the physical hardware layer, at least one VM running on the host, and virtual hardware that is virtualized on the at least one VM, where the physical hardware layer includes X pCPUs and Y physical input/output devices, the virtual hardware includes Z vCPUs, X, Y, and Z are positive integers greater than 1, the Y physical input/output devices include a $j^{th}$ physical input/output device, the at least one VM includes an $k^{th}$ VM, and the $j^{th}$ physical input/output device directs to the $k^{th}$ VM, and the method is executed by the host.

Step 301: Determine an $n^{th}$ pCPU from U target pCPUs when an $i^{th}$ physical interrupt occurs in the $j^{th}$ physical input/output device, where the U target pCPUs are pCPUs that have an affinity relationship with both the $i^{th}$ physical interrupt and V target vCPUs, the V target vCPUs are vCPUs that are virtualized on the $k^{th}$ VM and have an affinity relationship with an $i^{th}$ virtual interrupt, the $i^{th}$ virtual interrupt corresponds to the $i^{th}$ physical interrupt, the X pCPUs include the U target pCPUs, and the Z vCPUs include the V target vCPUs, where U is a positive integer greater than or equal to 1 and less than or equal to X, and V is a positive integer greater than or equal to 1 and less than or equal to Z.

Step 302: Use the $n^{th}$ pCPU to process the $i^{th}$ physical interrupt.

Step 303: Determine the $i^{th}$ virtual interrupt according to the $i^{th}$ physical interrupt.

Step 304: Determine an $m^{th}$ vCPU from V target vCPUs such that the $k^{th}$ VM uses the $m^{th}$ vCPU to execute the $i^{th}$ virtual interrupt, where i, j, k, m, and n are positive integers.

It can be seen that, in this embodiment of the present disclosure, the $n^{th}$ pCPU is determined from U target pCPUs when the $i^{th}$ physical interrupt occurs in the $j^{th}$ physical input/output device, where the U target pCPUs are pCPUs that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs include the U target pCPUs, and the Z vCPUs include the V target vCPUs, the $n^{th}$ pCPU is used to process the $i^{th}$ physical interrupt, the $i^{th}$ virtual interrupt is determined according to the $i^{th}$ physical interrupt, and the $m^{th}$ vCPU is determined from the V target vCPUs such that the $k^{th}$ VM uses the $m^{th}$ vCPU to execute the $i^{th}$ virtual interrupt. Therefore, according to the method in this embodiment of the present disclosure, VM-Exit due to an extra IPI that is caused because a pCPU with which a vCPU has an affinity is not a pCPU that is used to process a physical interrupt corresponding to a virtual interrupt that is processed by the vCPU can be effectively avoided, thereby effectively reducing the number of times of context switches, and reducing interference caused by a VM to a pCPU.

The host may implement, using a VM manage program, the method shown in FIG. 3. The VM manage program may also be referred to as a VM monitor (VMM) or a hypervisor. A typical VMM is VMware ESX, XEN, KVM/Qemu, or the like.

Further, that a pCPU has an affinity relationship with a physical interrupt indicates that the pCPU can process the physical interrupt. That a vCPU has an affinity relationship with a virtual interrupt indicates that the vCPU can process the virtual interrupt. That a pCPU has an affinity relationship with a vCPU indicates that the vCPU can run on the pCPU. Therefore, the $n^{th}$ pCPU is determined from the U target pCPUs according to the affinity relationship between the U target pCPUs and the $i^{th}$ physical interrupt.

Optionally, as an embodiment, the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt are determined in the following manners, Determining the affinity relationship between the V target vCPUs and the $i^{th}$ virtual interrupt, where the V target vCPUs are vCPUs that are virtualized on the $k^{h}$ VM and can process the $i^{th}$ virtual interrupt, determining the U target pCPUs, where the V target vCPUs can run on the U target pCPUs, and U is equal to 1, determining the $i^{th}$ physical interrupt corresponding to the $i^{th}$ virtual interrupt, and determining the affinity relationship between the $i^{th}$ physical interrupt and the U target pCPUs, where the $i^{th}$ physical interrupt can be processed by the U target pCPUs. The affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt may be preset and stored, and then when a physical interrupt occurs, a corresponding pCPU and vCPU may be found according to the stored affinity relationships to process the physical interrupt and a virtual interrupt, or when the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt are set, a corresponding pCPU and vCPU may be found according to these affinity relationships to process a corresponding physical interrupt and virtual interrupt. In this case, the $m^{th}$ vCPU that is used to process the $i^{th}$ virtual interrupt corresponding to the $i^{th}$ physical interrupt runs on the $n^{th}$ pCPU that processes the $i^{th}$ physical interrupt when the $i^{th}$ physical interrupt occurs.

Optionally, as another embodiment, the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt are determined in the following manners. Determining the affinity relationship between the V target vCPUs and the $i^{th}$ virtual interrupt, where the V target vCPUs are vCPUs that are virtualized on the $k^{th}$ VM and can process the $i^{th}$ virtual interrupt, determining the U target pCPUs, where the V target vCPUs can run on the multiple target pCPUs, and U is a positive integer greater than 1 and less than or equal to X, determining the $i^{th}$ physical interrupt corresponding to the $i^{th}$ virtual interrupt, and determining the affinity relationship between the $i^{th}$ physical interrupt and the U target pCPUs, where the $i^{th}$ physical interrupt can be processed by the U target pCPUs. The affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt may be preset and stored, and then when a physical interrupt occurs, a corresponding pCPU and vCPU may be found according to the stored affinity relationships to process the physical interrupt and a virtual interrupt, or when the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt are set, a corresponding pCPU and vCPU may be found according to these affinity relationships to process a corresponding physical interrupt and virtual interrupt. In this case, the $m^{th}$ vCPU that is used to process the $i^{th}$ virtual interrupt corresponding to the $i^{th}$ physical interrupt runs on a limited number of determined pCPUs instead of running on any pCPU at the physical hardware layer when the $i^{th}$ physical interrupt occurs, and may run on the $n^{th}$ pCPU that processes the $i^{th}$ physical interrupt.

Further, when the V target vCPUs can run on the multiple target pCPUs (in other words, when the affinity relationship between the $i^{th}$ physical interrupt and the U target pCPUs is a one-to-many affinity relationship), determining the $m^{th}$ vCPU from the V target vCPUs includes determining whether there is at least one target vCPU of the V target vCPUs that runs on the $n^{th}$ pCPU, and determining one target vCPU running on the $n^{th}$ pCPU as the $m^{th}$ vCPU when there is at least one target vCPU of the V target vCPUs that runs on the $n^{th}$ pCPU, or determining one target vCPU from the V target vCPUs as the $m^{th}$ vCPU according to a priority sequence when there is not at least one target vCPU of the V target vCPUs that runs on the $n^{th}$ pCPU. In this case, VM-Exit due to an extra IPI that is caused because a pCPU on which a vCPU runs is different from a pCPU that processes a physical interrupt may not occur if a vCPU that is used to process a virtual interrupt runs on a pCPU that is used to process a physical interrupt. The priority sequence may be preset priorities of the V target vCPUs. Selection of the priorities may also be determined using a round-robin policy, to ensure that a probability of selecting each target vCPU is the same.

Further, determining whether there is at least one target vCPU of the V target vCPUs that runs on the $n^{th}$ pCPU includes determining, according to virtual interrupt route information, whether there is at least one target vCPU of the V target vCPUs that runs on the $n^{th}$ pCPU, where the virtual interrupt route information includes a correspondence between the U target pCPUs and target vCPUs running on the U target pCPUs. In this way, the host can easily and quickly determine whether the $m^{th}$ vCPU runs on the $n^{th}$ pCPU.

Figure 4:
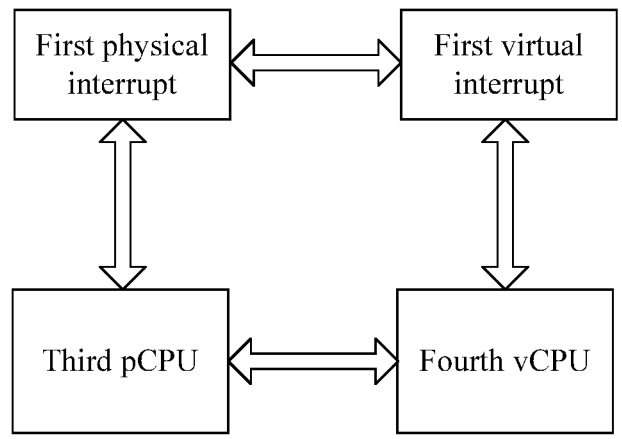
FIG. 4 is a schematic diagram of a correspondence among a virtual interrupt, a physical interrupt, a vCPU, and a pCPU according to an embodiment of the present disclosure.

FIG. 4 is a schematic diagram of a correspondence among a virtual interrupt, a physical interrupt, a vCPU, and a pCPU according to an embodiment of the present disclosure. As shown in FIG. 4, the first physical interrupt corresponds to the first virtual interrupt. The first virtual interrupt has an affinity relationship with the fourth vCPU. The fourth vCPU has an affinity relationship with the third pCPU. In this case, the third pCPU may be bound to the first physical interrupt such that the two have an affinity relationship. The third pCPU may process the first physical interrupt when the first physical interrupt occurs. Then, the first virtual interrupt that corresponds to the first physical interrupt and a vCPU that is used to process the first virtual interrupt are found. The fourth vCPU may be directly used to process the first virtual interrupt that corresponds to the first physical interrupt when the fourth vCPU runs on the third pCPU. In this way, VM-Exit due to an extra IPI that is caused because a pCPU on which a vCPU runs is different from a pCPU in which a physical interrupt occurs may not occur.

Figure 5:
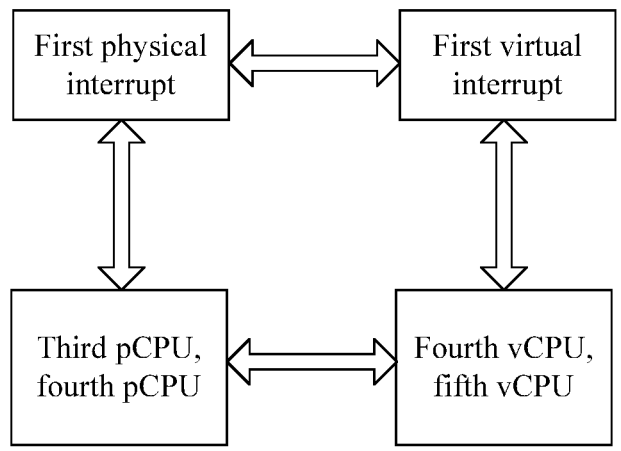
FIG. 5 is another schematic diagram of a correspondence among a virtual interrupt, a physical interrupt, a vCPU, and a pCPU according to an embodiment of the present disclosure.

FIG. 5 is another schematic diagram of a correspondence among a virtual interrupt, a physical interrupt, a vCPU, and a pCPU according to an embodiment of the present disclosure. As shown in FIG. 5, the first physical interrupt corresponds to the first virtual interrupt. The fourth vCPU and the fifth vCPU have an affinity relationship with both the third pCPU and the fourth pCPU. In other words, the fourth vCPU and the fifth vCPU may run on the third pCPU, or may run on the fourth pCPU. For example, at a first moment, the fourth vCPU runs on the third pCPU and the fifth vCPU runs on the fourth pCPU. At a second moment, the fourth vCPU and the fifth vCPU may simultaneously run on the third pCPU. In addition, the fourth vCPU and the fifth vCPU have an affinity relationship with the first virtual interrupt. That is, the first virtual interrupt may be processed by the fourth vCPU or the fifth vCPU. In this case, the third pCPU and the fourth pCPU may be both bound to the first physical interrupt such that the two have an affinity relationship. A host may select a pCPU from the third pCPU and the fourth pCPU to process the first physical interrupt when the first physical interrupt occurs. Then, the host finds the first virtual interrupt that corresponds to the first physical interrupt and a vCPU that is used to process the first virtual interrupt, and uses the vCPU to process the first virtual interrupt. A vCPU that is used to process a virtual interrupt may run on a pCPU that is used to process a physical interrupt. Therefore, VM-Exit due to an extra IPI that is caused because a pCPU on which a vCPU runs is different from a pCPU in which a physical interrupt occurs may not occur.

Figure 6:
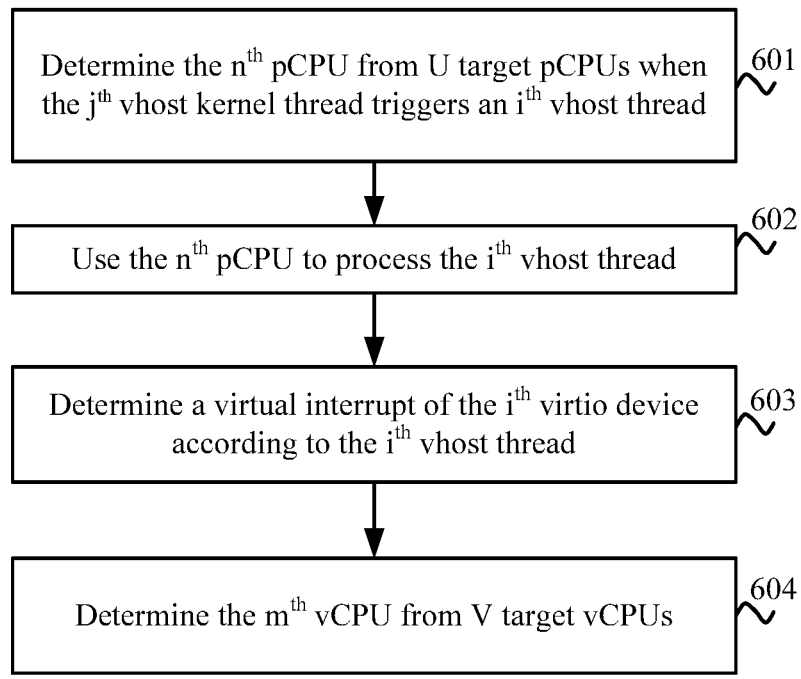
FIG. 6 is a schematic flowchart of another method for processing an interrupt by a virtualization platform according to the present disclosure.

FIG. 6 is a schematic flowchart of another method for processing an interrupt by a virtualization platform according to the present disclosure. The method shown in FIG. 6 may be applied to a computing node. The computing node includes a physical hardware layer, a host running at the physical hardware layer, Y VMs running on the host, Y vhost kernel threads running on the host, and virtual hardware that is virtualized on the at least one VM, where the physical hardware layer includes X pCPUs, the virtual hardware includes Z vCPUs, X, Y, and Z are positive integers greater than 1, each VM of the Y VMs includes a virtio device, the Y VMs include the $k^{th}$ VM, the $k^{th}$ VM includes an $i^{th}$ virtio device, and the $i^{th}$ virtio device corresponds to an $j^{th}$ vhost kernel thread of the Y vhost kernel threads, and the method is executed by the host.

Step 601: Determine the $n^{th}$ pCPU from U target pCPUs when the $j^{th}$ vhost kernel thread triggers an $i^{th}$ vhost thread, where the U target pCPUs are pCPUs that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs include the U target pCPUs, and the Z vCPUs include the V target vCPUs, where U is a positive integer greater than or equal to 1 and less than or equal to X, and V is a positive integer greater than or equal to 1 and less than or equal to Z.

Step 602: Use the $n^{th}$ pCPU to process the $i^{th}$ vhost thread.

Step 603: Determine the virtual interrupt of the $i^{th}$ virtio device according to the $i^{th}$ vhost thread.

Step 604: Determine the $m^{th}$ vCPU from the V target vCPUs such that the $k^{th}$ VM uses the $m^{th}$ vCPU to execute the virtual interrupt of the $i^{th}$ virtio device, where i, j, k, m, and n are positive integers.

In this embodiment of the present disclosure, when the $j^{th}$ vhost kernel thread triggers the $i^{th}$ vhost thread, the $n^{th}$ pCPU is determined from U target pCPUs, where the U target pCPUs are pCPUs that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs include the U target pCPUs, and the Z vCPUs include the V target vCPUs, the $n^{th}$ pCPU is used to process the $i^{th}$ vhost thread, the virtual interrupt of the $i^{th}$ virtio device is determined according to the $i^{th}$ vhost thread, and the $m^{th}$ vCPU is determined from the V target vCPUs such that the $k^{th}$ VM uses the $m^{th}$ vCPU to execute the virtual interrupt of the $i^{th}$ virtio device. It can be seen that according to the foregoing technical solution, VM-Exit due to an extra IPI that is caused because a pCPU with which a vCPU has an affinity is not a pCPU that is used to process a vhost thread corresponding to a virtual interrupt of a virtio device that is processed by the vCPU can be effectively avoided, thereby effectively reducing the number of times of context switches, and reducing interference caused by a VM to a pCPU.

The host may implement, using a VM manage program, the method shown in FIG. 6. The VM manage program may also be referred to as a VMM or a hypervisor. A typical VMM is VMware ESX, XEN, KVM/Qemu, or the like.

Further, that a pCPU has an affinity relationship with a vhost thread indicates that the pCPU can process the vhost thread. That a vCPU has an affinity relationship with a virtual interrupt of a virtio device indicates that the vCPU can process the virtual interrupt of the virtio device. That a pCPU has an affinity relationship with a vCPU indicates that the vCPU can run on the pCPU. Therefore, the $n^{th}$ pCPU is determined from the U target pCPUs according to the affinity relationship between the U target pCPUs and the $i^{th}$ vhost thread.

Optionally, as an embodiment, the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are determined in the following manners. Determining the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determining the U target pCPUs, where the V target vCPUs can run on the U target pCPUs, and U is equal to 1, determining the $i^{th}$ vhost thread corresponding to the virtual interrupt of the $i^{th}$ virtio device, and determining the affinity relationship between the $i^{th}$ vhost thread and the U target pCPUs, where the $i^{th}$ vhost thread can be processed by the U target pCPUs. The affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device may be preset and stored, and then when a vhost thread occurs, a corresponding pCPU and vCPU may be found according to the stored affinity relationships to process the vhost thread and a virtual interrupt of a virtio device, or when the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are set, a corresponding pCPU and vCPU may be found according to these affinity relationships to process a corresponding vhost thread and a corresponding virtual interrupt of a virtio device. In this case, the $m^{th}$ vCPU that is used to process the virtual interrupt of the $i^{th}$ virtio device runs on the $n^{th}$ pCPU that processes the $i^{th}$ vhost thread when the $i^{th}$ vhost thread occurs, where the virtual interrupt of the $i^{th}$ virtio device corresponds to the $i^{th}$ vhost thread.

Optionally, as another embodiment, the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are determined in the following manners determining the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determining the U target pCPUs, where the V target vCPUs can run on the multiple target pCPUs, and U is a positive integer greater than 1 and less than or equal to X, determining the $i^{th}$ vhost thread corresponding to the virtual interrupt of the $i^{th}$ virtio device, and determining the affinity relationship between the $i^{th}$ vhost thread and the U target pCPUs, where the $i^{th}$ vhost thread can be processed by the U target pCPUs. The affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device may be preset and stored, and then when a vhost thread occurs, a corresponding pCPU and vCPU may be found according to the stored affinity relationships to process the vhost thread and a virtual interrupt of a virtio device, or when the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are set, a corresponding pCPU and vCPU may be found according to these affinity relationships to process a corresponding vhost thread and a corresponding virtual interrupt of a virtio device. In this case, the $m^{th}$ vCPU that is used to process the virtual interrupt of the $i^{th}$ virtio device runs on a limited number of determined pCPUs instead of running on any pCPU at the physical hardware layer when the $i^{th}$ vhost thread occurs, and may run on the $n^{th}$ pCPU that processes the $i^{th}$ vhost thread, where the virtual interrupt of the $i^{th}$ virtio device corresponds to the $i^{th}$ vhost thread.

Further, when the V target vCPUs can run on the multiple target pCPUs (in other words, when the affinity relationship between the $i^{th}$ vhost thread and the U target pCPUs is a one-to-many affinity relationship), determining the $m^{th}$ vCPU from the V target vCPUs includes determining whether there is at least one target vCPU of the V target vCPUs that runs on the $n^{th}$ pCPU, and determining one target vCPU running on the $n^{th}$ pCPU as the $m^{th}$ vCPU when there is at least one target vCPU of the V target vCPUs that runs on the $n^{th}$ pCPU, or determining one target vCPU from the V target vCPUs as the $m^{th}$ vCPU according to a priority sequence when there is not at least one target vCPU of the V target vCPUs that runs on the $n^{th}$ pCPU. In this case, if a vCPU that is used to process a virtual interrupt of a virtio device runs on a pCPU that is used to process a vhost thread, VM-Exit due to an extra IPI that is caused because a pCPU on which a vCPU runs is different from a pCPU that processes a vhost thread may not occur. The priority sequence may be preset priorities of the V target vCPUs. Selection of the priorities may also be determined using a round-robin policy, to ensure that a probability of selecting each target vCPU is the same.

Further, determining whether there is at least one target vCPU of the V target vCPUs that runs on the $n^{th}$ pCPU includes determining, according to virtual interrupt route information of a virtio device, whether there is at least one target vCPU of the V target vCPUs that runs on the $n^{th}$ pCPU, where the virtual interrupt route information of the virtio device includes a correspondence between the U target pCPUs and target vCPUs running on the U target pCPUs. In this way, the host can easily and quickly determine whether the $m^{th}$ vCPU runs on the $n^{th}$ pCPU.

Figure 7:
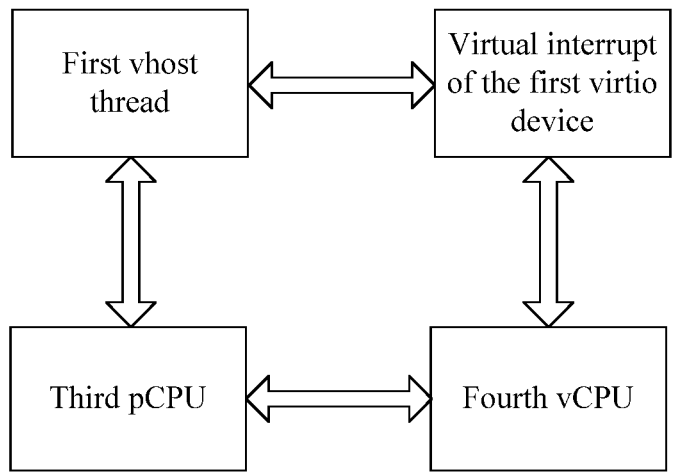
FIG. 7 is a schematic diagram of a correspondence among a virtual interrupt of a virtio device, a vhost thread, a vCPU, and a pCPU according to an embodiment of the present disclosure.

FIG. 7 is a schematic diagram of a correspondence among a virtual interrupt of a virtio device, a vhost thread, a vCPU, and a pCPU according to an embodiment of the present disclosure. As shown in FIG. 7, the first vhost thread corresponds to a virtual interrupt of the first virtio device. The fourth vCPU has an affinity relationship with the virtual interrupt of the first virtio device. The third pCPU has an affinity relationship with the fourth vCPU. In this case, the first vhost thread may be bound to the third pCPU such that the two have an affinity relationship. The third pCPU may process the first vhost thread when the first vhost thread occurs. Then, the virtual interrupt of the first virtio device and a vCPU that is used to process the virtual interrupt of the first virtio device are found, where the virtual interrupt of the first virtio device corresponds to the first vhost thread. The fourth vCPU may be directly used to process the virtual interrupt of the first virtio device when the fourth vCPU runs on the third pCPU, where the virtual interrupt of the first virtio device corresponds to the first vhost thread. In this way, VM-Exit due to an extra IPI that is caused because a pCPU on which a vCPU runs is different from a pCPU in which a vhost thread occurs may not occur.

Figure 8:
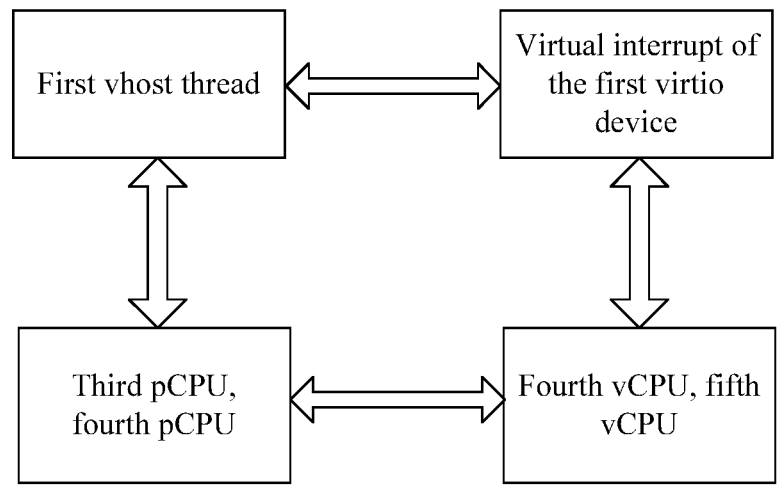
FIG. 8 is another schematic diagram of a correspondence among a virtual interrupt of a virtio device, a vhost thread, a vCPU, and a pCPU according to an embodiment of the present disclosure.

FIG. 8 is another schematic diagram of a correspondence among a virtual interrupt of a virtio device, a vhost thread, a vCPU, and a pCPU according to an embodiment of the present disclosure. As shown in FIG. 8, the first vhost thread corresponds to a virtual interrupt of the first virtio device. The third pCPU and the fourth pCPU have an affinity relationship with both the fourth vCPU and the fifth vCPU. In other words, the fourth vCPU and the fifth vCPU may run on the third pCPU, or may run on the fourth pCPU. For example, at a first moment, the fourth vCPU runs on the third pCPU and the fifth vCPU runs on the fourth pCPU. At a second moment, the fourth vCPU and the fifth vCPU may simultaneously run on the third pCPU. In addition, the fourth vCPU and the fifth vCPU have an affinity relationship with the virtual interrupt of the first virtio device. That is, the virtual interrupt of the first virtio device may be processed by the fourth vCPU or the fifth vCPU. In this case, the third pCPU and the fourth pCPU may be both bound to the first vhost thread such that the two have an affinity relationship. Then, a host may select a pCPU from the third pCPU and the fourth pCPU to process the first vhost thread when the first vhost thread occurs. Then, the host finds the virtual interrupt of the first virtio device and a vCPU that is used to process the virtual interrupt of the first virtio device, and uses the vCPU to process the virtual interrupt of the first virtio device, where the virtual interrupt of the first virtio device corresponds to the first vhost thread. A vCPU that is used to process a virtual interrupt of a virtio device may run on a pCPU that is used to process a vhost thread. Therefore, VM-Exit due to an extra IPI that is caused because a pCPU on which a vCPU runs is different from a pCPU in which a vhost thread occurs may not occur.

Figure 9:
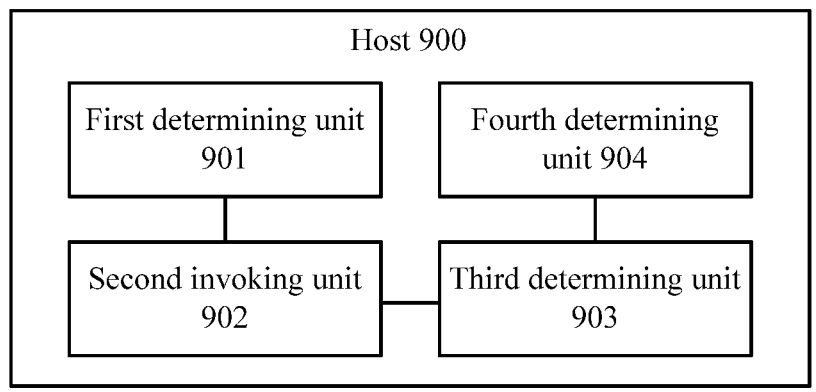
FIG. 9 is a structural block diagram of a host according to an embodiment of the present disclosure.

FIG. 9 is a structural block diagram of a host according to an embodiment of the present disclosure. A host 900 shown in FIG. 9 can execute all steps shown in FIG. 3. Further, the host 900 is applied to a computing node. The computing node includes a physical hardware layer, the host 900 running at the physical hardware layer, at least one VM running on the host 900, and virtual hardware that is virtualized on the at least one VM, where the physical hardware layer includes X pCPUs and Y physical input/output devices, the virtual hardware includes Z vCPUs, X, Y, and Z are positive integers greater than 1, the Y physical input/output devices include the $j^{th}$ physical input/output device, the at least one VM includes the $k^{th}$ VM, and the $j^{th}$ physical input/output device directs to the $k^{th}$ VM, and the host 900 includes a first determining unit 901, a second invoking unit 902, a third determining unit 903, and a fourth determining unit 904.

The first determining unit 901 is configured to determine the $n^{th}$ pCPU from U target pCPUs when the $i^{th}$ physical interrupt occurs in the $j^{th}$ physical input/output device, where the U target pCPUs are pCPUs that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs include the U target pCPUs, and the Z vCPUs include the V target vCPUs, where U is a positive integer greater than or equal to 1 and less than or equal to X, and V is a positive integer greater than or equal to 1 and less than or equal to Z.

The second invoking unit 902 is configured to use the $n^{th}$ pCPU to process the $i^{th}$ physical interrupt.

The third determining unit 903 is configured to determine the $i^{th}$ virtual interrupt according to the $i^{th}$ physical interrupt.

The fourth determining unit 904 is configured to determine the $m^{th}$ vCPU from the V target vCPUs such that the $k^{th}$ VM uses the $m^{th}$ vCPU to execute the $i^{th}$ virtual interrupt, where i, j, k, m, and n are positive integers.

It can be seen that, according to the host 900 in this embodiment of the present disclosure, when the $i^{th}$ physical interrupt occurs in the $j^{th}$ physical input/output device, the $n^{th}$ pCPU is determined from U target pCPUs, where the U target pCPUs are pCPUs that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs include the U target pCPUs, and the Z vCPUs include the V target vCPUs, the $n^{th}$ pCPU is used to process the $i^{th}$ physical interrupt, the $i^{th}$ virtual interrupt is determined according to the $i^{th}$ physical interrupt, and the $m^{th}$ vCPU is determined from the V target vCPUs such that the $k^{th}$ VM uses the $m^{th}$ vCPU to execute the $i^{th}$ virtual interrupt. Therefore, according to the host 900 shown in FIG. 9, VM-Exit due to an extra IPI that is caused because a pCPU with which a vCPU has an affinity is not a pCPU that is used to process a physical interrupt corresponding to a virtual interrupt that is processed by the vCPU can be effectively avoided, thereby effectively reducing the number of times of context switches, and reducing interference caused by a VM to a pCPU.

Optionally, as an embodiment, the first determining unit 901 is further configured to determine the affinity relationship between the V target vCPUs and the $i^{th}$ virtual interrupt, where the V target vCPUs are vCPUs that are virtualized on the $k^{th}$ VM and can process the $i^{th}$ virtual interrupt, determine the U target pCPUs, where the V target vCPUs can run on the U target pCPUs, and U is equal to 1, determine the $i^{th}$ physical interrupt corresponding to the $i^{th}$ virtual interrupt, and determine the affinity relationship between the $i^{th}$ physical interrupt and the U target pCPUs, where the $i^{th}$ physical interrupt can be processed by the U target pCPUs. In this way, the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt may be determined. In this case, the $m^{th}$ vCPU that is used to process the $i^{th}$ virtual interrupt corresponding to the $i^{th}$ physical interrupt runs on the $n^{th}$ pCPU that processes the $i^{th}$ physical interrupt when the $i^{th}$ physical interrupt occurs.

Optionally, as another embodiment, the first determining unit 901 is further configured to determine the affinity relationship between the V target vCPUs and the $i^{th}$ virtual interrupt, where the V target vCPUs are vCPUs that are virtualized on the $k^{th}$ VM and can process the $i^{th}$ virtual interrupt, determine the U target pCPUs, where the V target vCPUs can run on the multiple target pCPUs, and U is a positive integer greater than 1 and less than or equal to X, determine the $i^{th}$ physical interrupt corresponding to the $i^{th}$ virtual interrupt, and determine the affinity relationship between the $i^{th}$ physical interrupt and the U target pCPUs, where the $i^{th}$ physical interrupt can be processed by the U target pCPUs. In this way, the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt may be determined. In this case, when the $i^{th}$ physical interrupt occurs, the $m^{th}$ vCPU that is used to process the $i^{th}$ virtual interrupt corresponding to the $i^{th}$ physical interrupt runs on a limited number of determined pCPUs instead of running on any pCPU at the physical hardware layer, and may run on the $n^{th}$ pCPU that processes the $i^{th}$ physical interrupt.

Further, when the V target vCPUs can run on the multiple target pCPUs (in other words, when the affinity relationship between the $i^{th}$ physical interrupt and the U target pCPUs is a one-to-many affinity relationship), the fourth determining unit 904 is further configured to determine whether there is at least one target vCPU of the V target vCPUs that runs on the $n^{th}$ pCPU, and determine one target vCPU running on the $n^{th}$ pCPU as the $m^{th}$ vCPU such that the $k^{th}$ VM uses the $m^{th}$ vCPU to execute the $i^{th}$ virtual interrupt when there is at least one target vCPU of the V target vCPUs that runs on the $n^{th}$ pCPU, or determine one target vCPU from the V target vCPUs as the $m^{th}$ vCPU according to a priority sequence such that the $k^{th}$ VM uses the $m^{th}$ vCPU to execute the $i^{th}$ virtual interrupt when there is not at least one target vCPU of the V target vCPUs that runs on the $n^{th}$ pCPU. In this case, if a vCPU that is used to process a virtual interrupt runs on a pCPU that is used to process a physical interrupt, VM-Exit due to an extra IPI that is caused because a pCPU on which a vCPU runs is different from a pCPU in which a physical interrupt occurs may not occur. The priority sequence may be preset priorities of the V target vCPUs. Selection of the priorities may also be determined using a round-robin policy, to ensure that a probability of selecting each target vCPU is the same. Therefore, VM-Exit due to an extra IPI that is caused because a pCPU with which a vCPU has an affinity is not a pCPU that is used to process a physical interrupt corresponding to a virtual interrupt that is processed by the vCPU can be avoided to a greatest extent, thereby effectively reducing the number of times of context switches, and reducing interference caused by a VM to a pCPU.

Further, in an aspect of determining whether there is at least one target vCPU of the V target vCPUs that runs on the $n^{th}$ pCPU, the fourth determining unit 904 is further configured to determine, according to virtual interrupt route information, whether there is at least one target vCPU of the V target vCPUs that runs on the $n^{th}$ pCPU, where the virtual interrupt route information includes a correspondence between the U target pCPUs and target vCPUs running on the U target pCPUs. In this way, the host 900 can easily and quickly determine whether the $m^{th}$ vCPU runs on the $n^{th}$ pCPU.

Figure 10:
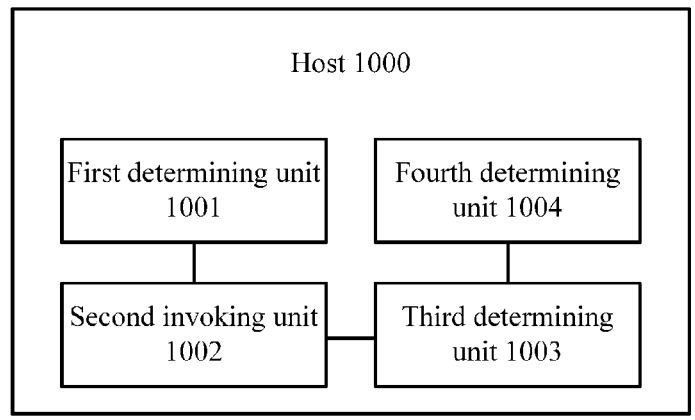
FIG. 10 is a structural block diagram of another host according to an embodiment of the present disclosure.

FIG. 10 is a structural block diagram of another host according to an embodiment of the present disclosure. A host 1000 shown in FIG. 10 can execute all steps shown in FIG. 6. The host 1000 is applied to a computing node. The computing node includes a physical hardware layer, the host 1000 running at the physical hardware layer, Y VMs running on the host 1000, Y vhost kernel threads running on the host 1000, and virtual hardware that is virtualized on the at least one VM, where the physical hardware layer includes X pCPUs, the virtual hardware includes Z vCPUs, X, Y, and Z are positive integers greater than 1, each VM of the Y VMs includes a paravirtualized driver virtio device, the Y VMs include the $k^{th}$ VM, the $k^{th}$ VM includes the $i^{th}$ virtio device, and the $i^{th}$ virtio device corresponds to the $j^{th}$ vhost kernel thread of the Y vhost kernel threads, and the host 1000 includes a first determining unit 1001, a second invoking unit 1002, a third determining unit 1003, and a fourth determining unit 1004.

The first determining unit 1001 is configured to determine the $n^{th}$ pCPU from U target pCPUs when the $j^{th}$ vhost kernel thread triggers the $i^{th}$ vhost thread, where the U target pCPUs are pCPUs that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs include the U target pCPUs, and the Z vCPUs include the V target vCPUs, where U is a positive integer greater than or equal to 1 and less than or equal to X, and V is a positive integer greater than or equal to 1 and less than or equal to Z.

The second invoking unit 1002 is configured to use the $n^{th}$ pCPU to process the $i^{th}$ vhost thread.

The third determining unit 1003 is configured to determine the virtual interrupt of the $i^{th}$ virtio device according to the $i^{th}$ vhost thread.

The fourth determining unit 1004 is configured to determine the $m^{th}$ vCPU from the V target vCPUs such that the $k^{th}$ VM uses the $m^{th}$ vCPU to execute the virtual interrupt of the $i^{th}$ virtio device, where i, j, k, m, and n are positive integers.

It can be seen that, according to the host provided in this embodiment of the present disclosure, the $n^{th}$ pCPU is determined from U target pCPUs when the $j^{th}$ vhost kernel thread triggers the $i^{th}$ vhost thread, where the U target pCPUs are pCPUs that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs include the U target pCPUs, and the Z vCPUs include the V target vCPUs, the $n^{th}$ pCPU is used to process the $i^{th}$ vhost thread, the virtual interrupt of the $i^{th}$ virtio device is determined according to the $i^{th}$ vhost thread, and the $m^{th}$ vCPU is determined from the V target vCPUs such that the $k^{th}$ VM uses the $m^{th}$ vCPU to execute the virtual interrupt of the $i^{th}$ virtio device. Therefore, according to the host 1000 shown in FIG. 10, VM-Exit due to an extra IPI that is caused because a pCPU with which a vCPU has an affinity is not a pCPU that is used to process a vhost thread corresponding to a virtual interrupt of a virtio device that is processed by the vCPU can be effectively avoided, thereby effectively reducing the number of times of context switches, and reducing interference caused by a VM to a pCPU.

Optionally, as an embodiment, the first determining unit 1001 is further configured to determine the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determine the U target pCPUs, where the V target vCPUs can run on the U target pCPUs, and U is equal to 1, determine the $i^{th}$ vhost thread corresponding to the virtual interrupt of the $i^{th}$ virtio device, and determine the affinity relationship between the $i^{th}$ vhost thread and the U target pCPUs, where the $i^{th}$ vhost thread can be processed by the U target pCPUs. The affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device may be preset and stored, and then when a vhost thread occurs, a corresponding pCPU and vCPU may be found according to the stored affinity relationships to process the vhost thread and a virtual interrupt of a virtio device, or when the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are set, a corresponding pCPU and vCPU may be found according to these affinity relationships to process a corresponding vhost thread and a corresponding virtual interrupt of a virtio device. In this case, the $m^{th}$ vCPU that is used to process the virtual interrupt of the $i^{th}$ virtio device runs on the $n^{th}$ pCPU that processes the $i^{th}$ vhost thread when the $i^{th}$ vhost thread occurs, where the virtual interrupt of the $i^{th}$ virtio device corresponds to the $i^{th}$ vhost thread.

Optionally, as another embodiment, the first determining unit 1001 is further configured to determine the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determine the U target pCPUs, where the V target vCPUs can run on the multiple target pCPUs, and U is a positive integer greater than 1 and less than or equal to X, determine the $i^{th}$ vhost thread corresponding to the virtual interrupt of the $i^{th}$ virtio device, and determine the affinity relationship between the $i^{th}$ vhost thread and the U target pCPUs, where the $i^{th}$ vhost thread can be processed by the U target pCPUs. The affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device may be preset and stored, and then when a vhost thread occurs, a corresponding pCPU and vCPU may be found according to the stored affinity relationships to process the vhost thread and a virtual interrupt of a virtio device, or when the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are set, a corresponding pCPU and vCPU may be found according to these affinity relationships to process a corresponding vhost thread and a corresponding virtual interrupt of a virtio device. In this case, the $m^{th}$ vCPU that is used to process the virtual interrupt of the $i^{th}$ virtio device runs on a limited number of determined pCPUs instead of running on any pCPU at the physical hardware layer when the $i^{th}$ vhost thread occurs, and may run on the $n^{th}$ pCPU that processes the $i^{th}$ vhost thread, where the virtual interrupt of the $i^{th}$ virtio device corresponds to the $i^{th}$ vhost thread.

Further, when the V target vCPUs can run on the multiple target pCPUs (in other words, when the affinity relationship between the $i^{th}$ vhost thread and the U target pCPUs is a one-to-many affinity relationship), the fourth determining unit 1004 is further configured to determine whether there is at least one target vCPU of the V target vCPUs that runs on the $n^{th}$ pCPU, and determine one target vCPU running on the $n^{th}$ pCPU as the $m^{th}$ vCPU such that the $k^{th}$ VM uses the $m^{th}$ vCPU to execute the virtual interrupt of the $i^{th}$ virtio device when there is at least one target vCPU of the V target vCPUs that runs on the $n^{th}$ pCPU, or determine one target vCPU from the V target vCPUs as the $m^{th}$ vCPU according to a priority sequence such that the $k^{th}$ VM uses the $m^{th}$ vCPU to execute the virtual interrupt of the $i^{th}$ virtio device when there is not at least one target vCPU of the V target vCPUs that runs on the $n^{th}$ pCPU. In this case, VM-Exit due to an extra IPI that is caused because a pCPU on which a vCPU runs is different from a pCPU that processes a vhost thread may not occur if a vCPU that is used to process a virtual interrupt of a virtio device runs on a pCPU that is used to process a vhost thread. The priority sequence may be preset priorities of the V target vCPUs. Selection of the priorities may also be determined using a round-robin policy, to ensure that a probability of selecting each target vCPU is the same. Therefore, VM-Exit due to an extra IPI that is caused because a pCPU with which a vCPU has an affinity is not a pCPU that is used to process a physical interrupt corresponding to a virtual interrupt that is processed by the vCPU can be avoided to a greatest extent, thereby effectively reducing the number of times of context switches, and reducing interference caused by a VM to a pCPU.

Further, in an aspect of determining whether there is at least one target vCPU of the V target vCPUs that runs on the $n^{th}$ pCPU, the fourth determining unit 1004 is further configured to determine, according to virtual interrupt route information of a virtio device, whether there is at least one target vCPU of the V target vCPUs that runs on the $n^{th}$ pCPU, where the virtual interrupt route information of the virtio device includes a correspondence between the U target pCPUs and target vCPUs running on the U target pCPUs. In this way, the host 1000 can easily and quickly determine whether the $m^{th}$ vCPU runs on the $n^{th}$ pCPU.

Figure 11:
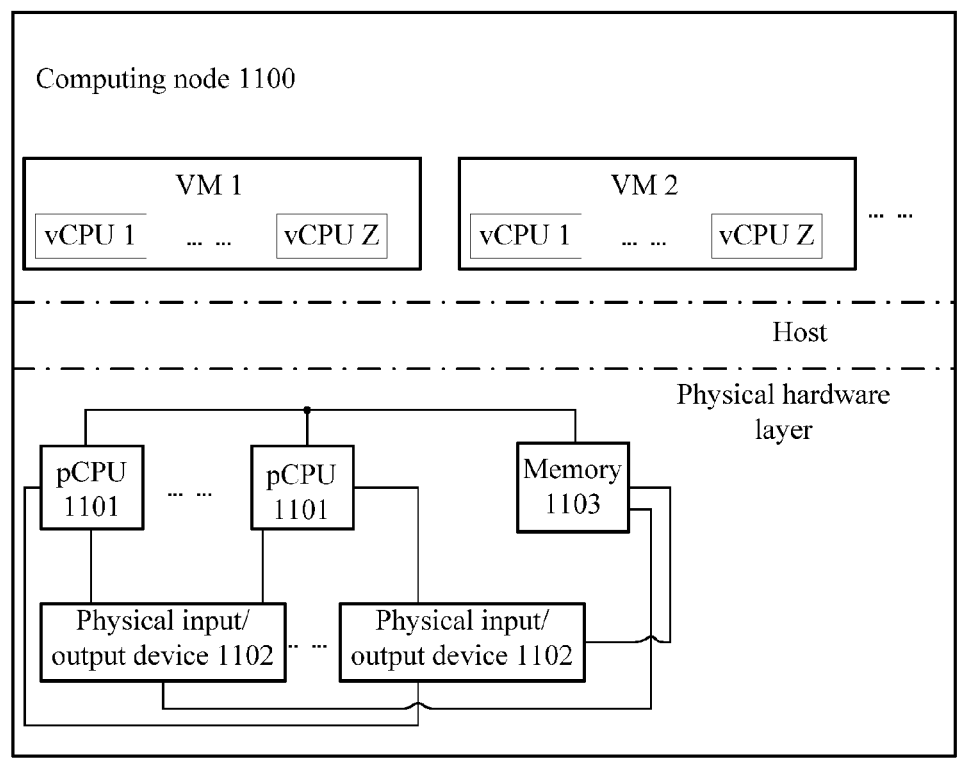
FIG. 11 is a structural block diagram of a computing node according to an embodiment of the present disclosure.

FIG. 11 is a structural block diagram of a computing node according to an embodiment of the present disclosure. The computing node 1100 shown in FIG. 11 can execute all steps shown in FIG. 3. The computing node 1100 includes Y physical input/output devices 1102, where the Y physical input/output devices 1102 include the $j^{th}$ physical input/output device 1102, X pCPUs 1101, a memory 1103 that is connected to each of the X pCPUs 1101 and each of the Y physical input/output devices 1102, where one or more pCPUs of the X pCPUs 1101 are configured to invoke or execute an operation instruction stored in the memory 1103, a host, at least one VM, and virtual hardware that is virtualized on the at least one VM, where the virtual hardware includes Z vCPUs, the at least one VM includes the $k^{th}$ VM, and the $j^{th}$ physical input/output device 1102 directs to the $k^{th}$ VM, and the host is configured to determine the $n^{th}$ pCPU 1101 from U target pCPUs 1101 when the $i^{th}$ physical interrupt occurs in the $j^{th}$ physical input/output device 1102, where the U target pCPUs 1101 are pCPUs 1101 that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs 1101 include the U target pCPUs 1101, and the Z vCPUs include the V target vCPUs, use the $n^{th}$ pCPU 1101 to process the $i^{th}$ physical interrupt, determine the $i^{th}$ virtual interrupt according to the $i^{th}$ physical interrupt, and determine the $m^{th}$ vCPU from the V target vCPUs such that the $k^{th}$ VM uses the $m^{th}$ vCPU to execute the $i^{th}$ virtual interrupt, where X, Y, and Z are positive integers greater than 1, U is a positive integer greater than or equal to 1 and less than or equal to X, V is a positive integer greater than or equal to 1 and less than or equal to Z, and i, j, k, m, and n are positive integers.

It can be seen that, according to the computing node 1100 in this embodiment of the present disclosure, when the $i^{th}$ physical interrupt occurs in the $j^{th}$ physical input/output device 1102, the $n^{th}$ pCPU 1101 is determined from U target pCPUs 1101, where the U target pCPUs 1101 are pCPUs 1101 that have an affinity relationship with both the $i^{th}$ physical interrupt and V target vCPUs, the V target vCPUs are vCPUs that are virtualized on the $k^{th}$ VM and have an affinity relationship with the $i^{th}$ virtual interrupt, the $i^{th}$ virtual interrupt corresponds to the $i^{th}$ physical interrupt, the X pCPUs 1101 include the U target pCPUs 1101, and the Z vCPUs include the V target vCPUs, the $n^{th}$ pCPU 1101 is used to process the $i^{th}$ physical interrupt, the $i^{th}$ virtual interrupt is determined according to the $i^{th}$ physical interrupt, and the $m^{th}$ vCPU is determined from the V target vCPUs such that the $k^{th}$ VM uses the $m^{th}$ vCPU to execute the $i^{th}$ virtual interrupt. Therefore, according to the computing node 1100 shown in FIG. 11, VM-Exit due to an extra IPI that is caused because a pCPU 1101 with which a vCPU has an affinity is not a pCPU 1101 that is used to process a physical interrupt corresponding to a virtual interrupt that is processed by the vCPU can be effectively avoided, thereby effectively reducing the number of times of context switches, and reducing interference caused by a VM to a pCPU 1101.

Optionally, as an embodiment, the host is further configured to determine the affinity relationship between the U target pCPUs 1101 and the $i^{th}$ physical interrupt, the affinity relationship between the U target pCPUs 1101 and the V target vCPUs, and the affinity relationship between the V target vCPUs and the $i^{th}$ virtual interrupt in the following manners. Determining the affinity relationship between the V target vCPUs and the $i^{th}$ virtual interrupt, where the V target vCPUs are vCPUs that are virtualized on the $k^{th}$ VM and can process the $i^{th}$ virtual interrupt, determining the U target pCPUs 1101, where the V target vCPUs can run on the U target pCPUs 1101, and U is equal to 1, determining the $i^{th}$ physical interrupt corresponding to the $i^{th}$ virtual interrupt, and determining the affinity relationship between the $i^{th}$ physical interrupt and the U target pCPUs 1101, where the $i^{th}$ physical interrupt can be processed by the U target pCPUs 1101. The affinity relationship between the U target pCPUs 1101 and the $i^{th}$ physical interrupt, the affinity relationship between the U target pCPUs 1101 and the V target vCPUs, and the affinity relationship between the V target vCPUs and the $i^{th}$ virtual interrupt may be preset and stored, and then when a physical interrupt occurs, a corresponding pCPU 1101 and vCPU may be found according to the stored affinity relationships to process the physical interrupt and a virtual interrupt, or when the affinity relationship between the U target pCPUs 1101 and the $i^{th}$ physical interrupt, the affinity relationship between the U target pCPUs 1101 and the V target vCPUs, and the affinity relationship between the V target vCPUs and the $i^{th}$ virtual interrupt are set, a corresponding pCPU 1101 and vCPU may be found according to these affinity relationships to process a corresponding physical interrupt and virtual interrupt. In this case, when the $i^{th}$ physical interrupt occurs, the $m^{th}$ vCPU that is used to process the $i^{th}$ virtual interrupt corresponding to the $i^{th}$ physical interrupt runs on the $n^{th}$ pCPU 1101 that processes the $i^{th}$ physical interrupt.

Optionally, as another embodiment, the host is further configured to determine the affinity relationship between the U target pCPUs 1101 and the $i^{th}$ physical interrupt, the affinity relationship between the U target pCPUs 1101 and the V target vCPUs, and the affinity relationship between the V target vCPUs and the $i^{th}$ virtual interrupt in the following manners determining the affinity relationship between the V target vCPUs and the $i^{th}$ virtual interrupt, where the V target vCPUs are vCPUs that are virtualized on the $k^{th}$ VM and can process the $i^{th}$ virtual interrupt, determining the U target pCPUs 1101, where the V target vCPUs can run on the multiple target pCPUs 1101, and U is a positive integer greater than 1 and less than or equal to X, determining the $i^{th}$ physical interrupt corresponding to the $i^{th}$ virtual interrupt, and determining the affinity relationship between the $i^{th}$ physical interrupt and the U target pCPUs 1101, where the $i^{th}$ physical interrupt can be processed by the U target pCPUs 1101. The affinity relationship between the U target pCPUs 1101 and the $i^{th}$ physical interrupt, the affinity relationship between the U target pCPUs 1101 and the V target vCPUs, and the affinity relationship between the V target vCPUs and the $i^{th}$ virtual interrupt may be preset and stored, and then when a physical interrupt occurs, a corresponding pCPU and vCPU may be found according to the stored affinity relationships to process the physical interrupt and a virtual interrupt, or when the affinity relationship between the U target pCPUs 1101 and the $i^{th}$ physical interrupt, the affinity relationship between the U target pCPUs 1101 and the V target vCPUs, and the affinity relationship between the V target vCPUs and the $i^{th}$ virtual interrupt are set, a corresponding pCPU 1101 and vCPU may be found according to these affinity relationships to process a corresponding physical interrupt and virtual interrupt. In this case, the $m^{th}$ vCPU that is used to process the $i^{th}$ virtual interrupt corresponding to the $i^{th}$ physical interrupt runs on a limited number of determined pCPUs 1101 instead of running on any pCPU 1101 at the physical hardware layer when the $i^{th}$ physical interrupt occurs, and may run on the $n^{th}$ pCPU 1101 that processes the $i^{th}$ physical interrupt.

Further, when the V target vCPUs can run on the multiple target pCPUs 1101 (in other words, when the affinity relationship between the $i^{th}$ physical interrupt and the U target pCPUs 1101 is a one-to-many affinity relationship), in an aspect of determining the $m^{th}$ vCPU from the V target vCPUs, the host is further configured to determine whether there is at least one target vCPU of the V target vCPUs that runs on the $n^{th}$ pCPU 1101, and determine one target vCPU running on the $n^{th}$ pCPU 1101 as the $m^{th}$ vCPU when there is at least one target vCPU of the V target vCPUs that runs on the $n^{th}$ pCPU 1101, or determine one target vCPU from the V target vCPUs as the $m^{th}$ vCPU according to a priority sequence when there is not at least one target vCPU of the V target vCPUs that runs on the $n^{th}$ pCPU 1101. In this case, if a vCPU that is used to process a virtual interrupt runs on a pCPU 1101 that is used to process a physical interrupt, VM-Exit due to an extra IPI that is caused because a pCPU 1101 on which a vCPU runs is different from a pCPU 1101 in which a physical interrupt occurs may not occur. The priority sequence may be preset priorities of the V target vCPUs. Selection of the priorities may also be determined using a round-robin policy, to ensure that a probability of selecting each target vCPU is the same. Therefore, VM-Exit due to an extra IPI that is caused because a pCPU 1101 with which a vCPU has an affinity is not a pCPU 1101 that is used to process a physical interrupt corresponding to a virtual interrupt that is processed by the vCPU can be avoided to a greatest extent, thereby effectively reducing the number of times of context switches, and reducing interference caused by a VM to a pCPU 1101.

Further, in an aspect of determining whether there is at least one target vCPU of the V target vCPUs that runs on the $n^{th}$ pCPU 1101, the host is further configured to determine, according to virtual interrupt route information, whether there is at least one target vCPU of the V target vCPUs that runs on the $n^{th}$ pCPU 1101, where the virtual interrupt route information includes a correspondence between the U target pCPUs 1101 and target vCPUs running on the U target pCPUs 1101. In this way, the host can easily and quickly determine whether the $m^{th}$ vCPU runs on the $n^{th}$ pCPU 1101.

Figure 12:
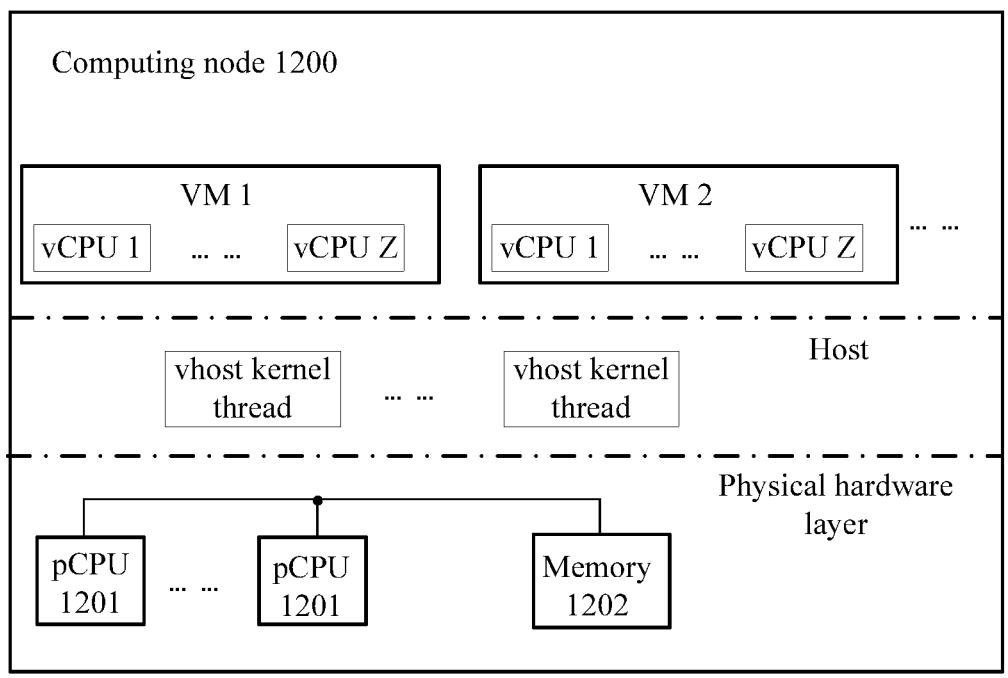
FIG. 12 is a structural block diagram of another computing node according to an embodiment of the present disclosure.

FIG. 12 is a structural block diagram of another computing node according to an embodiment of the present disclosure. A computing node 1200 shown in FIG. 12 can execute all steps shown in FIG. 6. The computing node 1200 includes X pCPUs 1201, a memory 1202 that is connected to the X pCPUs 1201, where one or more pCPUs 1201 of the X physical central processing units pCPUs 1201 are configured to invoke or execute an operation instruction stored in the memory 1202, a host, Y VMs, Y vhost kernel threads, and virtual hardware that is virtualized on the at least one VM, where the virtual hardware includes Z vCPUs, each VM of the Y VMs includes a virtio device, the Y VMs include the $k^{th}$ VM, the $k^{th}$ VM includes the $i^{th}$ virtio device, and the $i^{th}$ virtio device corresponds to the $j^{th}$ vhost kernel thread of the Y vhost kernel threads, and the host is configured to determine the $n^{th}$ pCPU 1201 from U target pCPUs 1201 when the $j^{th}$ vhost kernel thread triggers the $i^{th}$ vhost thread, where the U target pCPUs 1201 are pCPUs 1201 that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs 1201 include the U target pCPUs 1201, and the Z vCPUs include the V target vCPUs, use the $n^{th}$ pCPU 1201 to process the $i^{th}$ vhost thread, determine the virtual interrupt of the $i^{th}$ virtio device according to the $i^{th}$ vhost thread, and determine the $m^{th}$ vCPU from the V target vCPUs such that the $k^{th}$ VM uses the $m^{th}$ vCPU to execute the virtual interrupt of the $i^{th}$ virtio device, where X, Y, and Z are positive integers greater than 1, U is a positive integer greater than or equal to 1 and less than or equal to X, V is a positive integer greater than or equal to 1 and less than or equal to Z, and i, j, k, m, and n are positive integers.

According to the computing node 1200 in this embodiment of the present disclosure, when the $j^{th}$ vhost kernel thread triggers the $i^{th}$ vhost thread, the $n^{th}$ pCPU 1201 is determined from U target pCPUs 1201, where the U target pCPUs 1201 are pCPUs 1201 that have an affinity relationship with both the $i^{th}$ vhost thread and V target vCPUs, the V target vCPUs are vCPUs that are virtualized on the $k^{th}$ VM and have an affinity relationship with a virtual interrupt of the $i^{th}$ virtio device, the virtual interrupt of the $i^{th}$ virtio device corresponds to the $i^{th}$ vhost thread, the X pCPUs 1201 include the U target pCPUs 1201, and the Z vCPUs include the V target vCPUs, the $n^{th}$ pCPU 1201 is used to process the $i^{th}$ vhost thread, the virtual interrupt of the $i^{th}$ virtio device is determined according to the $i^{th}$ vhost thread, and the $m^{th}$ vCPU is determined from the V target vCPUs such that the $k^{th}$ VM uses the $m^{th}$ vCPU to execute the virtual interrupt of the $i^{th}$ virtio device. Therefore, according to the computing node 1200 shown in FIG. 12, VM-Exit due to an extra IPI that is caused because a pCPU 1201 with which a vCPU has an affinity is not a pCPU 1201 that is used to process a vhost thread corresponding to a virtual interrupt of a virtio device that is processed by the vCPU can be effectively avoided, thereby effectively reducing the number of times of context switches, and reducing interference caused by a VM to a pCPU 1201.

Optionally, as an embodiment, the host is further configured to determine the affinity relationship between the U target pCPUs 1201 and the $i^{th}$ vhost thread, the affinity relationship between the U target pCPUs 1201 and the V target vCPUs, and the affinity relationship between the V target vCPUs and the virtual interrupt of the $i^{th}$ virtio device in the following manners. Determining the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determining the U target pCPUs 1201, where the V target vCPUs can run on the U target pCPUs 1201, and U is equal to 1, determining the $i^{th}$ vhost thread corresponding to the virtual interrupt of the $i^{th}$ virtio device, and determining the affinity relationship between the $i^{th}$ vhost thread and the U target pCPUs 1201, where the $i^{th}$ vhost thread can be processed by the U target pCPUs 1201. The affinity relationship between the U target pCPUs 1201 and the $i^{th}$ vhost thread, the affinity relationship between the U target pCPUs 1201 and the V target vCPUs, and the affinity relationship between the V target vCPUs and the virtual interrupt of the $i^{th}$ virtio device may be preset and stored, and then when a vhost thread occurs, a corresponding pCPU 1201 and vCPU may be found according to the stored affinity relationships to process the vhost thread and a virtual interrupt of a virtio device, or when the affinity relationship between the U target pCPUs 1201 and the $i^{th}$ vhost thread, the affinity relationship between the U target pCPUs 1201 and the V target vCPUs, and the affinity relationship between the V target vCPUs and the virtual interrupt of the $i^{th}$ virtio device are set, a corresponding pCPU 1201 and vCPU may be found according to these affinity relationships to process a corresponding vhost thread and a corresponding virtual interrupt of a virtio device. In this case, the $m^{th}$ vCPU that is used to process the virtual interrupt of the $i^{th}$ virtio device runs on the $n^{th}$ pCPU 1201 that processes the $i^{th}$ vhost thread when the $i^{th}$ vhost thread occurs, where the virtual interrupt of the $i^{th}$ virtio device corresponds to the $i^{th}$ vhost thread.

Optionally, as another embodiment, the host is further configured to determine the affinity relationship between the U target pCPUs 1201 and the $i^{th}$ vhost thread, the affinity relationship between the U target pCPUs 1201 and the V target vCPUs, and the affinity relationship between the V target vCPUs and the virtual interrupt of the $i^{th}$ virtio device in the following manners. Determining the affinity relationship between the V target vCPUs and the virtual interrupt of the $i^{th}$ virtio device, where the V target vCPUs are vCPUs that are virtualized on the $k^{th}$ VM and can process the virtual interrupt of the $i^{th}$ virtio device, determining the U target pCPUs 1201, where the V target vCPUs can run on the multiple target pCPUs 1201, and U is a positive integer greater than 1 and less than or equal to X, determining the $i^{th}$ vhost thread corresponding to the virtual interrupt of the $i^{th}$ virtio device, and determining the affinity relationship between the $i^{th}$ vhost thread and the U target pCPUs 1201, where the $i^{th}$ vhost thread can be processed by the U target pCPUs 1201. The affinity relationship between the U target pCPUs 1201 and the $i^{th}$ vhost thread, the affinity relationship between the U target pCPUs 1201 and the V target vCPUs, and the affinity relationship between the V target vCPUs and the virtual interrupt of the $i^{th}$ virtio device may be preset and stored, and then when a vhost thread occurs, a corresponding pCPU 1201 and vCPU may be found according to the stored affinity relationships to process the vhost thread and a virtual interrupt of a virtio device, or when the affinity relationship between the U target pCPUs 1201 and the $i^{th}$ vhost thread, the affinity relationship between the U target pCPUs 1201 and the V target vCPUs, and the affinity relationship between the V target vCPUs and the virtual interrupt of the $i^{th}$ virtio device are set, a corresponding pCPU 1201 and vCPU may be found according to these affinity relationships to process a corresponding vhost thread and a corresponding virtual interrupt of a virtio device. In this case, when the $i^{th}$ vhost thread occurs, the $m^{th}$ vCPU that is used to process the virtual interrupt of the $i^{th}$ virtio device runs on a limited number of determined pCPUs 1201 instead of running on any pCPU 1201 at the physical hardware layer, and may run on the $n^{th}$ pCPU 1201 that processes the $i^{th}$ vhost thread, where the virtual interrupt of the virtio device corresponds to the $i^{th}$ vhost thread.

Further, when the V target vCPUs can run on the multiple target pCPUs 1201 (in other words, when the affinity relationship between the $i^{th}$ vhost thread and the U target pCPUs 1201 is a one-to-many affinity relationship), in an aspect of determining the $m^{th}$ vCPU from the V target vCPUs, the host is further configured to determine whether there is at least one target vCPU of the V target vCPUs that runs on the $n^{th}$ pCPU 1201, and determine one target vCPU running on the $n^{th}$ pCPU 1201 as the $m^{th}$ vCPU such that the $k^{th}$ VM uses the $m^{th}$ vCPU to execute the virtual interrupt of the $i^{th}$ virtio device when there is at least one target vCPU of the V target vCPUs that runs on the $n^{th}$ pCPU 1201, or determine one target vCPU from the V target vCPUs as the $m^{th}$ vCPU according to a priority sequence such that the $k^{th}$ VM uses the $m^{th}$ vCPU to execute the virtual interrupt of the $i^{th}$ virtio device when there is not at least one target vCPU of the V target vCPUs that runs on the $n^{th}$ pCPU 1201. In this case, if a vCPU that is used to process a virtual interrupt of a virtio device runs on a pCPU 1201 that is used to process a vhost thread, VM-Exit due to an extra IPI that is caused because a pCPU 1201 on which a vCPU runs is different from a pCPU 1201 that processes a vhost thread may not occur. The priority sequence may be preset priorities of the V target vCPUs. Selection of the priorities may also be determined using a round-robin policy, to ensure that a probability of selecting each target vCPU is the same. Therefore, VM-Exit due to an extra IPI that is caused because a pCPU 1201 with which a vCPU has an affinity is not a pCPU 1201 that is used to process a physical interrupt corresponding to a virtual interrupt that is processed by the vCPU can be avoided to a greatest extent, thereby effectively reducing the number of times of context switches, and reducing interference caused by a VM to a pCPU 1201.

Further, in an aspect of determining whether there is at least one target vCPU of the V target vCPUs that runs on the $n^{th}$ pCPU 1201, the host is configured to determine, according to virtual interrupt route information of a virtio device, whether there is at least one target vCPU of the V target vCPUs that runs on the $n^{th}$ pCPU 1201, where the virtual interrupt route information of the virtio device includes a correspondence between the U target pCPUs 1201 and target vCPUs running on the U target pCPUs 1201. In this way, the host can easily and quickly determine whether the $m^{th}$ vCPU runs on the $n^{th}$ pCPU 1201.

A person of ordinary skill in the art may understand that all or some of the processes of the methods in the foregoing embodiments may be implemented by a computer program instructing relevant hardware (for example, a processor). The program may be stored in a computer-readable storage medium. The processes of the methods in the foregoing embodiments are performed when the program runs. The storage medium may include a magnetic disc, an optical disc, a read-only memory (ROM), or a random access memory (RAM).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The functions may be stored in a computer-readable storage medium when the functions are implemented in the form of a software functional unit and sold or used as an independent product. Based on such an understanding, the technical solutions of the present disclosure essentially, or the part contributing to the prior art, or some of the technical solutions may be implemented in the form of a software product. The software product is stored in a storage medium and includes several instructions for instructing a computer device (which may be a personal computer, a server, or a network device) or a processor to execute all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing an interrupt by a virtualization platform, wherein the method is applied to a computing node, wherein the computing node comprises a physical hardware layer, a host running at the physical hardware layer, at least one virtual machine (VM) running on the host, and virtual hardware that is virtualized on the at least one VM, wherein the physical hardware layer comprises X physical central processing units (pCPUs) and Y physical input/output devices, wherein the virtual hardware comprises Z virtual central processing units (vCPUs), wherein the Y physical input/output devices comprise a $j^{th}$ physical input/output device, wherein the at least one VM comprises a $k^{th}$ VM, wherein the $j^{th}$ physical input/output device directs to the $k^{th}$ VM, wherein the method is executed by the host, and wherein the method comprises:

determining an $n^{th}$ pCPU from U target pCPUs when an $i^{th}$ physical interrupt occurs in the $j^{th}$ physical input/output device, wherein the U target pCPUs are pCPUs that comprise an affinity relationship with both the $i^{th}$ physical interrupt and V target vCPUs, wherein the V target vCPUs are vCPUs that are virtualized on the $k^{th}$ VM and comprise an affinity relationship with an $i^{th}$ virtual interrupt, wherein the $i^{th}$ virtual interrupt corresponds to the $i^{th}$ physical interrupt, wherein the X pCPUs comprise the U target pCPUs, and wherein the Z vCPUs comprise the V target vCPUs;

setting the $n^{th}$ pCPU to process the $i^{th}$ physical interrupt;

determining the $i^{th}$ virtual interrupt according to the $i^{th}$ physical interrupt; and determining an $m^{th}$ vCPU from the V target vCPUs such that the $k^{th}$ VM uses the $m^{th}$ vCPU to execute the $i^{th}$ virtual interrupt, wherein X, Y, and Z are positive integers greater than 1, wherein U is a positive integer greater than or equal to 1 and less than or equal to X, wherein V is a positive integer greater than or equal to 1 and less than or equal to Z, and wherein i, j, k, m, and n are positive integers.

2. The method according to claim 1, wherein the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt are determined in the following manners:

determining the affinity relationship between the V target vCPUs and the $i^{th}$ virtual interrupt, wherein the V target vCPUs are vCPUs that are virtualized on the $k^{th}$ VM and can process the $i^{th}$ virtual interrupt;

determining the U target pCPUs, wherein the V target vCPUs can run on the U target pCPUs, wherein U is equal to 1;

determining the $i^{th}$ physical interrupt corresponding to the $i^{th}$ virtual interrupt; and determining the affinity relationship between the $i^{th}$ physical interrupt and the U target pCPUs, wherein the $i^{th}$ physical interrupt can be processed by the U target pCPUs.

3. The method according to claim 1, wherein the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt are determined in the following manners:

determining the affinity relationship between the V target vCPUs and the $i^{th}$ virtual interrupt, wherein the V target vCPUs are vCPUs that are virtualized on the $k^{th}$ VM and can process the $i^{th}$ virtual interrupt;

determining the U target pCPUs, wherein the V target vCPUs can run on multiple target pCPUs, and wherein U is a positive integer greater than 1 and less than or equal to X;

determining the $i^{th}$ physical interrupt corresponding to the $i^{th}$ virtual interrupt; and determining the affinity relationship between the $i^{th}$ physical interrupt and the U target pCPUs, wherein the $i^{th}$ physical interrupt can be processed by the U target pCPUs.

4. The method according to claim 3, wherein when the affinity relationship between the $i^{th}$ physical interrupt and the U target pCPUs is a one-to-many affinity relationship, determining the $m^{th}$ vCPU from the V target vCPUs comprises:

determining whether there is at least one target vCPU of the V target vCPUs that runs on the $n^{th}$ pCPU;

determining one target vCPU running on the $n^{th}$ pCPU as the $m^{th}$ vCPU when there is at least one target vCPU of the V target vCPUs that runs on the $n^{th}$ pCPU; and determining one target vCPU from the V target vCPUs as the $m^{th}$ vCPU according to a priority sequence when there is not at least one target vCPU of the V target vCPUs that runs on the $n^{th}$ pCPU.

5. The method according to claim 4, wherein determining whether there is at least one target vCPU of the V target vCPUs that runs on the $n^{th}$ pCPU comprises determining, according to virtual interrupt route information, whether there is at least one target vCPU of the V target vCPUs that runs on the $n^{th}$ pCPU, wherein the virtual interrupt route information comprises a correspondence between the U target pCPUs and target vCPUs running on the U target pCPUs.

6. A method for processing an interrupt by a virtualization platform, wherein the method is applied to a computing node, wherein the computing node comprises a physical hardware layer, a host running at the physical hardware layer, Y virtual machines (VMs) running on the host, Y virtual host (vhost) kernel threads running on the host, and virtual hardware that is virtualized on the Y VMs, wherein the physical hardware layer comprises X physical central processing units (pCPUs), wherein the virtual hardware comprises Z virtual central processing units (vCPUs), wherein each VM of the Y VMs comprises a paravirtualized driver (virtio device), wherein the Y VMs comprise a $k^{th}$ VM, wherein the $k^{th}$ VM comprises an $i^{th}$ virtio device, wherein the $i^{th}$ virtio device corresponds to a $i^{th}$ vhost kernel thread of the Y vhost kernel threads, wherein the method is executed by the host, and wherein the method comprises:

determining an $n^{th}$ pCPU from U target pCPUs when the $j^{th}$ vhost kernel thread triggers an $i^{th}$ vhost thread, wherein the U target pCPUs are pCPUs that comprise an affinity relationship with both the $i^{th}$ vhost thread and V target vCPUs, wherein the V target vCPUs are vCPUs that are virtualized on the $k^{th}$ VM and comprise an affinity relationship with a virtual interrupt of the $i^{th}$ virtio device, wherein the virtual interrupt of the $i^{th}$ virtio device corresponds to the $i^{th}$ vhost thread, wherein the X pCPUs comprise the U target pCPUs, and wherein the Z vCPUs comprise the V target vCPUs;

setting the $n^{th}$ pCPU to process the $i^{th}$ vhost thread;

determining the virtual interrupt of the $i^{th}$ virtio device according to the $i^{th}$ vhost thread; and determining an $m^{th}$ vCPU from the V target vCPUs such that the $k^{th}$ VM uses the $m^{th}$ vCPU to execute the virtual interrupt of the $i^{th}$ virtio device, wherein X, Y, and Z are positive integers greater than 1, wherein U is a positive integer greater than or equal to 1 and less than or equal to X, wherein V is a positive integer greater than or equal to 1 and less than or equal to Z, and wherein i, j, k, m, and n are positive integers.

7. The method according to claim 6, wherein the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are determined in the following manners:

determining the affinity relationship between the V target vCPUs and an $i^{th}$ virtual interrupt, wherein the V target vCPUs are vCPUs that are virtualized on the $k^{th}$ VM and can process the virtual interrupt of the $i^{th}$ virtio device;

determining the U target pCPUs, wherein the V target vCPUs can run on the U target pCPUs, wherein U is equal to 1;

determining the $i^{th}$ vhost thread corresponding to the virtual interrupt of the $i^{th}$ virtio device; and determining the affinity relationship between the $i^{th}$ vhost thread and the U target pCPUs, wherein the $i^{th}$ vhost thread can be processed by the U target pCPUs.

8. The method according to claim 6, wherein the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device are determined in the following manners:
  determining the affinity relationship between the V target vCPUs and the virtual interrupt of the $i^{th}$ virtio device, wherein the V target vCPUs are vCPUs that are virtualized on the $k^{th}$ VM and can process the virtual interrupt of the $i^{th}$ virtio device;
  determining the U target pCPUs, wherein the V target vCPUs can run on the multiple target pCPUs, wherein U is a positive integer greater than 1 and less than or equal to X;
  determining the $i^{th}$ vhost thread corresponding to the virtual interrupt of the $i^{th}$ virtio device; and
  determining the affinity relationship between the $i^{th}$ vhost thread and the U target pCPUs, wherein the $i^{th}$ vhost thread can be processed by the U target pCPUs.

9. The method according to claim 8, wherein when the affinity relationship between the $i^{th}$ vhost thread and the U target pCPUs is a one-to-many affinity relationship, determining the $m^{th}$ vCPU from the V target vCPUs comprises:
  determining whether there is at least one target vCPU of the V target vCPUs that runs on the $n^{th}$ pCPU;
  determining one target vCPU running on the $n^{th}$ pCPU as the $m^{th}$ vCPU when there is at least one target vCPU of the V target vCPUs that runs on the $n^{th}$ pCPU; or
  determining one target vCPU from the V target vCPUs as the $m^{th}$ vCPU according to a priority sequence when there is not at least one target vCPU of the V target vCPUs that runs on the $n^{th}$ pCPU.

10. The method according to claim 9, wherein determining whether there is at least one target vCPU of the V target vCPUs that runs on the $n^{th}$ pCPU comprises determining, according to virtual interrupt route information of a virtio device, whether there is at least one target vCPU of the V target vCPUs that runs on the $n^{th}$ pCPU, wherein the virtual interrupt route information of the virtio device comprises a correspondence between the U target pCPUs and target vCPUs running on the U target pCPUs.

11. A host applied to a computing node, wherein the computing node comprises a physical hardware layer, the host running at the physical hardware layer, at least one virtual machine (VM) running on the host, and virtual hardware that is virtualized on the at least one VM, wherein the physical hardware layer comprises X physical central processing units (pCPUs) and Y physical input/output devices, wherein the virtual hardware comprises Z virtual central processing units (vCPUs), wherein the Y physical input/output devices comprise a $j^{th}$ physical input/output device, wherein the at least one VM comprises a $k^{th}$ VM, wherein the $j^{th}$ physical input/output device directs to the $k^{th}$ VM, and wherein the host comprises:
  a memory; and
  a processor coupled to the memory and configured to:
    determine an $n^{th}$ pCPU from U target pCPUs when an $i^{th}$ physical interrupt occurs in the $j^{th}$ physical input/output device, wherein the U target pCPUs are pCPUs that comprise an affinity relationship with both the $i^{th}$ physical interrupt and V target vCPUs, wherein the V target vCPUs are vCPUs that are virtualized on the $k^{th}$ VM and comprise an affinity relationship with an $i^{th}$ virtual interrupt, wherein the $i^{th}$ virtual interrupt corresponds to the $i^{th}$ physical interrupt, wherein the X pCPUs comprise the U target pCPUs, and wherein the Z vCPUs comprise the V target vCPUs;
    set the $n^{th}$ pCPU to process the $i^{th}$ physical interrupt;
    determine the $i^{th}$ virtual interrupt according to the $i^{th}$ physical interrupt; and
    determine an $m^{th}$ vCPU from the V target vCPUs such that the $k^{th}$ VM uses the $m^{th}$ vCPU to execute the $i^{th}$ virtual interrupt,
    wherein X, Y, and Z are positive integers greater than 1, wherein U is a positive integer greater than or equal to 1 and less than or equal to X, wherein V is a positive integer greater than or equal to 1 and less than or equal to Z, and wherein i, j, k, m, and n are positive integers.

12. The host according to claim 11, wherein processor is further configured to:
  determine the affinity relationship between the V target vCPUs and the $i^{th}$ virtual interrupt, wherein the V target vCPUs are vCPUs that are virtualized on the $k^{th}$ VM and can process the $i^{th}$ virtual interrupt;
  determine the U target pCPUs, wherein the V target vCPUs can run on the U target pCPUs, wherein U is equal to 1;
  determine the $i^{th}$ physical interrupt corresponding to the $i^{th}$ virtual interrupt; and
  determine the affinity relationship between the $i^{th}$ physical interrupt and the U target pCPUs, wherein the $i^{th}$ physical interrupt can be processed by the U target pCPUs.

13. The host according to claim 11, wherein the processor is further configured to:
  determine the affinity relationship between the V target vCPUs and the $i^{th}$ virtual interrupt, wherein the V target vCPUs are vCPUs that are virtualized on the $k^{th}$ VM and can process the $i^{th}$ virtual interrupt;
  determine the U target pCPUs, wherein the V target vCPUs can run on multiple target pCPUs, and wherein U is a positive integer greater than 1 and less than or equal to X;
  determine the $i^{th}$ physical interrupt corresponding to the $i^{th}$ virtual interrupt; and
  determine the affinity relationship between the $i^{th}$ physical interrupt and the U target pCPUs, wherein the $i^{th}$ physical interrupt can be processed by the U target pCPUs.

14. The host according to claim 13, wherein the processor is further configured to:
  determine whether there is at least one target vCPU of the V target vCPUs that runs on the $n^{th}$ pCPU;
  determine one target vCPU running on the $n^{th}$ pCPU as the $m^{th}$ vCPU such that the $k^{th}$ VM uses the $m^{th}$ vCPU to execute the $i^{th}$ virtual interrupt when there is at least one target vCPU of the V target vCPUs that runs on the $n^{th}$ pCPU; and
  determine one target vCPU from the V target vCPUs as the $m^{th}$ vCPU according to a priority sequence such that the $k^{th}$ VM uses the $m^{th}$ vCPU to execute the $i^{th}$ virtual interrupt when there is not at least one target vCPU of the V target vCPUs that runs on the $n^{th}$ pCPU.

15. The host according to claim 14, wherein determining whether there is at least one target vCPU of the V target vCPUs that runs on the $n^{th}$ pCPU, the processor is further configured to determine, according to virtual interrupt route information, whether there is at least one target vCPU of the V target vCPUs that runs on the $n^{th}$ pCPU, wherein the virtual interrupt route information comprises a correspondence between the U target pCPUs and target vCPUs running on the U target pCPUs.

16. A host applied to a computing node, wherein the computing node comprises a physical hardware layer, the host running at the physical hardware layer, Y virtual machines (VMs) running on the host, Y virtual host (vhost) kernel threads running on the host, and virtual hardware that is virtualized on the Y VMs, wherein the physical hardware layer comprises X physical central processing units (pCPUs), wherein the virtual hardware comprises Z virtual central processing units (vCPUs), wherein each VM of the Y VMs comprises a paravirtualized driver (virtio device), wherein the Y VMs comprise a $k^{th}$ VM, wherein the $k^{th}$ VM comprises an $i^{th}$ virtio device, wherein the $i^{th}$ virtio device corresponds to a $j^{th}$ vhost kernel thread of the Y vhost kernel threads, and wherein the host comprises:
  a memory; and
  a processor coupled to the memory and configured to:
    determine an $n^{th}$ pCPU from U target pCPUs when the $j^{th}$ vhost kernel thread triggers an $i^{th}$ vhost thread, wherein the U target pCPUs are pCPUs that comprise an affinity relationship with both the $i^{th}$ vhost thread and V target vCPUs, wherein the V target vCPUs are vCPUs that are virtualized on the $k^{th}$ VM and comprise an affinity relationship with a virtual interrupt of the $i^{th}$ virtio device, wherein the virtual interrupt of the $i^{th}$ virtio device corresponds to the $i^{th}$ vhost thread, wherein the X pCPUs comprise the U target pCPUs, and wherein the Z vCPUs comprise the V target vCPUs;
    set the $n^{th}$ pCPU to process the $i^{th}$ vhost thread;
    determine the virtual interrupt of the $i^{th}$ virtio device according to the $i^{th}$ vhost thread; and
    determine an $m^{th}$ vCPU from the V target vCPUs such that the $k^{th}$ VM uses the $m^{th}$ vCPU to execute the virtual interrupt of the $i^{th}$ virtio device,
  wherein X, Y, and Z are positive integers greater than 1, wherein U is a positive integer greater than or equal to 1 and less than or equal to X, wherein V is a positive integer greater than or equal to 1 and less than or equal to Z, and wherein i, j, k, m, and n are positive integers.

17. The host according to claim 16, wherein the processor is further configured to:
  determine the affinity relationship between the V target vCPUs and an $i^{th}$ virtual interrupt, wherein the V target vCPUs are vCPUs that are virtualized on the $k^{th}$ VM and can process the virtual interrupt of the $i^{th}$ virtio device;
  determine the U target pCPUs, wherein the V target vCPUs can run on the U target pCPUs, wherein U is equal to 1;
  determine the $i^{th}$ vhost thread corresponding to the virtual interrupt of the $i^{th}$ virtio device; and
  determine the affinity relationship between the $i^{th}$ vhost thread and the U target pCPUs, wherein the $i^{th}$ vhost thread can be processed by the U target pCPUs.

18. The host according to claim 16, wherein the processor is further configured to:
  determine the affinity relationship between the V target vCPUs and an $i^{th}$ virtual interrupt, wherein the V target vCPUs are vCPUs that are virtualized on the $k^{th}$ VM and can process the virtual interrupt of the $i^{th}$ virtio device;
  determine the U target pCPUs, wherein the V target vCPUs can run on the multiple target pCPUs, and wherein U is a positive integer greater than 1 and less than or equal to X;
  determine the $i^{th}$ vhost thread corresponding to the virtual interrupt of the $i^{th}$ virtio device; and
  determine the affinity relationship between the $i^{th}$ vhost thread and the U target pCPUs, wherein the $i^{th}$ vhost thread can be processed by the U target pCPUs.

19. The host according to claim 18, wherein the processor is further configured to:
  determine whether there is at least one target vCPU of the V target vCPUs that runs on the $n^{th}$ pCPU;
  determine one target vCPU running on the $n^{th}$ pCPU as the $m^{th}$ vCPU such that the $k^{th}$ VM uses the $m^{th}$ vCPU to execute the virtual interrupt of the $i^{th}$ virtio device when there is at least one target vCPU of the V target vCPUs that runs on the $n^{th}$ pCPU; and
  determine one target vCPU from the V target vCPUs as the $m^{th}$ vCPU according to a priority sequence such that the $k^{th}$ VM uses the $m^{th}$ vCPU to execute the virtual interrupt of the $i^{th}$ virtio device when there is not at least one target vCPU of the V target vCPUs that runs on the $n^{th}$ pCPU.

20. The host according to claim 19, wherein determining whether there is at least one target vCPU of the V target vCPUs that runs on the $n^{th}$ pCPU, the processor is further configured to determine, according to virtual interrupt route information of a virtio device, whether there is at least one target vCPU of the V target vCPUs that runs on the $n^{th}$ pCPU, wherein the virtual interrupt route information of the virtio device comprises a correspondence between the U target pCPUs and target vCPUs running on the U target pCPUs.

21. A computing node, comprising:
  Y physical input/output devices, wherein the Y physical input/output devices comprise a $j^{th}$ physical input/output device;
  X physical central processing units (pCPUs);
  a memory that is connected to each of the X pCPUs and each of the Y physical input/output devices, wherein one or more pCPUs of the X pCPUs are configured to invoke or execute an operation instruction stored in the memory;
  a host;
  at least one virtual machine (VM); and
  virtual hardware that is virtualized on the at least one VM, wherein the virtual hardware comprises Z virtual central processing units (vCPUs),
  wherein the at least one VM comprises a $k^{th}$ VM,
  wherein the $j^{th}$ physical input/output device directs to the $k^{th}$ VM,
  wherein the host is configured to:
    determine an $n^{th}$ pCPU from U target pCPUs when an $i^{th}$ physical interrupt occurs in the $j^{th}$ physical input/output device, wherein the U target pCPUs are pCPUs that comprise an affinity relationship with both the $i^{th}$ physical interrupt and V target vCPUs, wherein the V target vCPUs are vCPUs that are virtualized on the $k^{th}$ VM and comprise an affinity relationship with an $i^{th}$ virtual interrupt, wherein the $i^{th}$ virtual interrupt corresponds to the $i^{th}$ physical interrupt, wherein the X pCPUs comprise the U target pCPUs, and wherein the Z vCPUs comprise the V target vCPUs;

set the $n^{th}$ pCPU to process the $i^{th}$ physical interrupt;
determine the $i^{th}$ virtual interrupt according to the $i^{th}$ physical interrupt; and
determine an $m^{th}$ vCPU from the V target vCPUs such that the $k^{th}$ VM uses the $m^{th}$ vCPU to execute the $i^{th}$ virtual interrupt,
wherein X, Y, and Z are positive integers greater than 1,
wherein U is a positive integer greater than or equal to 1 and less than or equal to X,
wherein V is a positive integer greater than or equal to 1 and less than or equal to Z, and
wherein i, j, k, m, and n are positive integers.

22. The computing node according to claim 21, wherein the host is further configured to determine the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt in the following manners:
determine the affinity relationship between the V target vCPUs and the $i^{th}$ virtual interrupt, wherein the V target vCPUs are vCPUs that are virtualized on the $k^{th}$ VM and can process the $i^{th}$ virtual interrupt;
determine the U target pCPUs, wherein the V target vCPUs can run on the U target pCPUs, wherein U is equal to 1;
determine the $i^{th}$ physical interrupt corresponding to the $i^{th}$ virtual interrupt; and
determine the affinity relationship between the $i^{th}$ physical interrupt and the U target pCPUs, wherein the $i^{th}$ physical interrupt can be processed by the U target pCPUs.

23. The computing node according to claim 21, wherein the host is further configured to determine the affinity relationship between the U target pCPUs and the $i^{th}$ physical interrupt, the affinity relationship between the U target pCPUs and the V target vCPUs, and the affinity relationship between the V target vCPUs and the $i^{th}$ virtual interrupt in the following manners:
determine the affinity relationship between the V target vCPUs and the $i^{th}$ virtual interrupt, wherein the V target vCPUs are vCPUs that are virtualized on the $k^{th}$ VM and can process the $i^{th}$ virtual interrupt;
determine the U target pCPUs, wherein the V target vCPUs can run on multiple target pCPUs, and wherein U is a positive integer greater than 1 and less than or equal to X;
determine the $i^{th}$ physical interrupt corresponding to the $i^{th}$ virtual interrupt; and
determine the affinity relationship between the $i^{th}$ physical interrupt and the U target pCPUs, wherein the $i^{th}$ physical interrupt can be processed by the U target pCPUs.

24. The computing node according to claim 23, wherein determining the $m^{th}$ vCPU from the V target vCPUs, the host is further configured to:
determine whether there is at least one target vCPU of the V target vCPUs that runs on the $n^{th}$ pCPU;
determine one target vCPU running on the $n^{th}$ pCPU as the $m^{th}$ vCPU when there is at least one target vCPU of the V target vCPUs that runs on the $n^{th}$ pCPU; and
determine one target vCPU from the V target vCPUs as the $m^{th}$ vCPU according to a priority sequence when there is not at least one target vCPU of the V target vCPUs that runs on the $n^{th}$ pCPU.

25. The computing node according to claim 24, wherein determining whether there is at least one target vCPU of the V target vCPUs that runs on the $n^{th}$ pCPU, the host is further configured to determine, according to virtual interrupt route information, whether there is at least one target vCPU of the V target vCPUs that runs on the $n^{th}$ pCPU, wherein the virtual interrupt route information comprises a correspondence between the U target pCPUs and target vCPUs running on the U target pCPUs.

26. A computing node, comprising:
X physical central processing units (pCPUs);
a memory that is connected to the X pCPUs, wherein one or more pCPUs of the X pCPUs are configured to invoke or execute an operation instruction stored in the memory;
a host;
Y virtual machines (VMs);
Y virtual host (vhost) kernel threads; and
virtual hardware that is virtualized on the Y VMs,
wherein the virtual hardware comprises Z virtual central processing units (vCPUs),
wherein each VM of the Y VMs comprises a paravirtualized driver (virtio device),
wherein the Y VMs comprise a $k^{th}$ VM, wherein the $k^{th}$ VM comprises an $i^{th}$ virtio device,
wherein the $i^{th}$ virtio device corresponds to a $j^{th}$ vhost kernel thread of the Y vhost kernel threads,
wherein the host is configured to:
determine an $n^{th}$ pCPU from U target pCPUs when the $j^{th}$ vhost kernel thread triggers an $i^{th}$ vhost thread, wherein the U target pCPUs are pCPUs that have an affinity relationship with both the $i^{th}$ vhost thread and V target vCPUs, wherein the V target vCPUs are vCPUs that are virtualized on the $k^{th}$ VM and have an affinity relationship with a virtual interrupt of the $i^{th}$ virtio device, wherein the virtual interrupt of the $i^{th}$ virtio device corresponds to the $i^{th}$ vhost thread, wherein the X pCPUs comprise the U target pCPUs, and wherein the Z vCPUs comprise the V target vCPUs;
set the $n^{th}$ pCPU to process the $i^{th}$ thread;
determine the virtual interrupt of the $i^{th}$ virtio device according to the $i^{th}$ vhost thread; and
determine an $m^{th}$ vCPU from the V target vCPUs such that the $k^{th}$ VM uses the $m^{th}$ vCPU to execute the virtual interrupt of the $i^{th}$ virtio device,
wherein X, Y, and Z are positive integers greater than 1,
wherein U is a positive integer greater than or equal to 1 and less than or equal to X,
wherein V is a positive integer greater than or equal to 1 and less than or equal to Z, and
wherein i, j, k, m, and n are positive integers.

27. The computing node according to claim 26, wherein the host is further configured to determine the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device in the following manners:
determine the affinity relationship between the V target vCPUs and the virtual interrupt of the $i^{th}$ virtio device, wherein the V target vCPUs are vCPUs that are virtualized on the $k^{th}$ VM and can process the virtual interrupt of the $i^{th}$ virtio device;
determine the U target pCPUs, wherein the V target vCPUs can run on the U target pCPUs, wherein U is equal to 1;
determine the $i^{th}$ vhost thread corresponding to the virtual interrupt of the $i^{th}$ virtio device; and determine the affinity relationship between the $i^{th}$ vhost thread and the U target pCPUs, wherein the $i^{th}$ vhost thread can be processed by the U target pCPUs.

28. The computing node according to claim 26, wherein the host is further configured to determine the affinity relationship between the U target pCPUs and the $i^{th}$ vhost thread, the affinity relationship between the U target pCPUs and the V target vCPUs, and the affinity relationship between the V target vCPUs and the virtual interrupt of the $i^{th}$ virtio device in the following manners:
- determine the affinity relationship between the V target vCPUs and the $i^{th}$ virtual interrupt, wherein the V target vCPUs are vCPUs that are virtualized on the $k^{th}$ VM and can process the virtual interrupt of the $i^{th}$ virtio device;
- determine the U target pCPUs, wherein the V target vCPUs can run on the multiple target pCPUs, wherein U is a positive integer greater than 1 and less than or equal to X;
- determine the $i^{th}$ vhost thread corresponding to the virtual interrupt of the $i^{th}$ virtio device; and
- determine the affinity relationship between the $i^{th}$ vhost thread and the U target pCPUs, wherein the $i^{th}$ vhost thread can be processed by the U target pCPUs.

29. The computing node according to claim 28, wherein determining the $m^{th}$ vCPU from the V target vCPUs, the host is further configured to:
- determine whether there is at least one target vCPU of the V target vCPUs that runs on the $n^{th}$ pCPU;
- determine one target vCPU running on the $n^{th}$ pCPU as the $m^{th}$ vCPU when there is at least one target vCPU of the V target vCPUs that runs on the $n^{th}$ pCPU; and
- determine one target vCPU from the V target vCPUs as the $m^{th}$ vCPU according to a priority sequence when there is not at least one target vCPU of the V target vCPUs that runs on the $n^{th}$ pCPU.

30. The computing node according to claim 29, wherein determining whether there is at least one target vCPU of the V target vCPUs that runs on the $n^{th}$ pCPU, the host is further configured to determine, according to virtual interrupt route information of a virtio device, whether there is at least one target vCPU of the V target vCPUs that runs on the $n^{th}$ pCPU, wherein the virtual interrupt route information of the virtio device comprises a correspondence between the U target pCPUs and target vCPUs running on the U target pCPUs.

* * * * *

UNITED STATES PATENT AND TRADEMARK OFFICE
CERTIFICATE OF CORRECTION

PATENT NO. : 10,169,075 B2
APPLICATION NO. : 15/384961
DATED : January 1, 2019
INVENTOR(S) : Haoyu Zhang and Hongyong Zang Page 1 of 1

It is certified that error appears in the above-identified patent and that said Letters Patent is hereby corrected as shown below:

In the Claims

Column 32, Line 23: "$i^{th}$ vhost kernel" should read "$j^{th}$ vhost kernel"

Signed and Sealed this
Fifth Day of March, 2019

Andrei Iancu
*Director of the United States Patent and Trademark Office*